Nov. 10, 1925.

R. COVER

MACHINE FOR DEBUTTING CORN

Filed Sept. 20, 1918 16 Sheets-Sheet 1

1,560,977

Nov. 10, 1925
R. COVER
MACHINE FOR DEBUTTING CORN
Filed Sept. 20, 1918    16 Sheets-Sheet 7

1,560,977

Inventor
Ralph Cover
By Sturtevant & Mason
Attorney

Witness

Nov. 10, 1925.

R. COVER

MACHINE FOR DEBUTTING CORN

Filed Sept. 20, 1918    16 Sheets-Sheet 9

1,560,977

Inventor
Ralph Cover
By Sturtevant & Mason
Attorneys

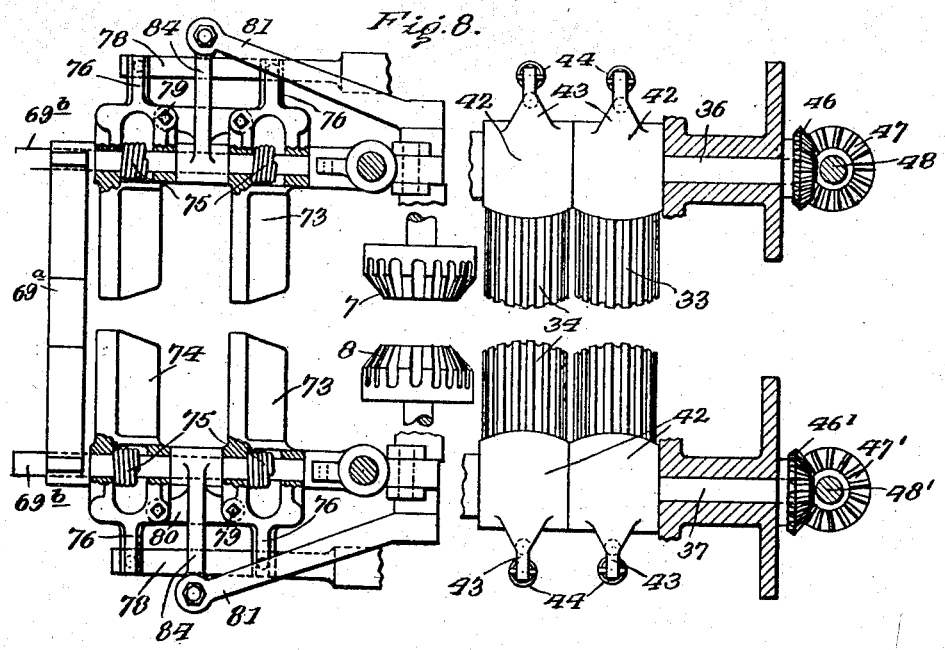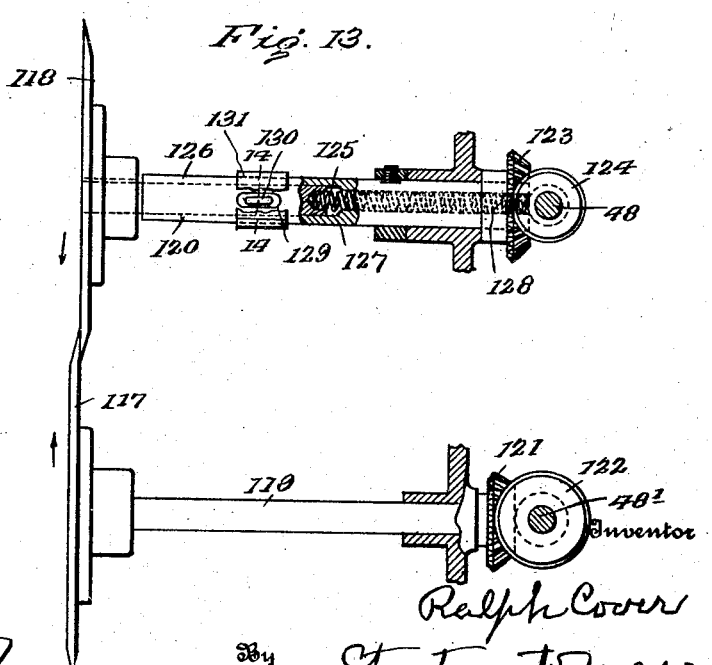

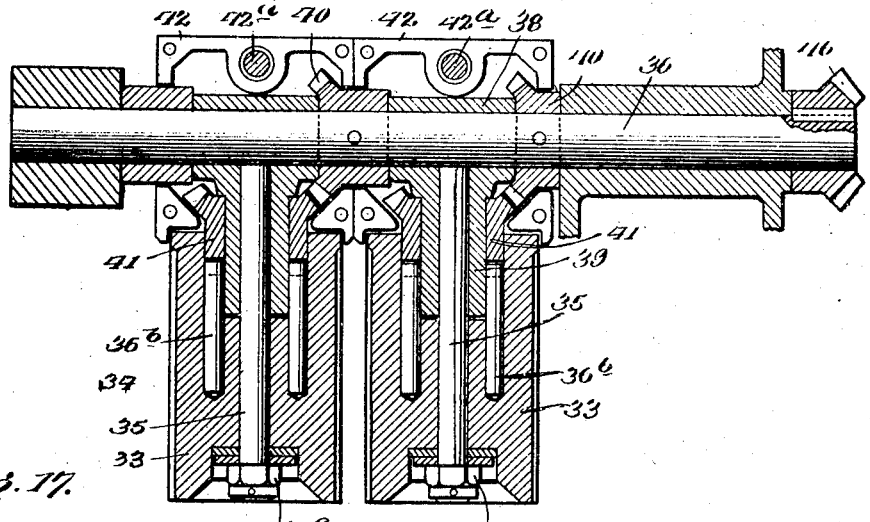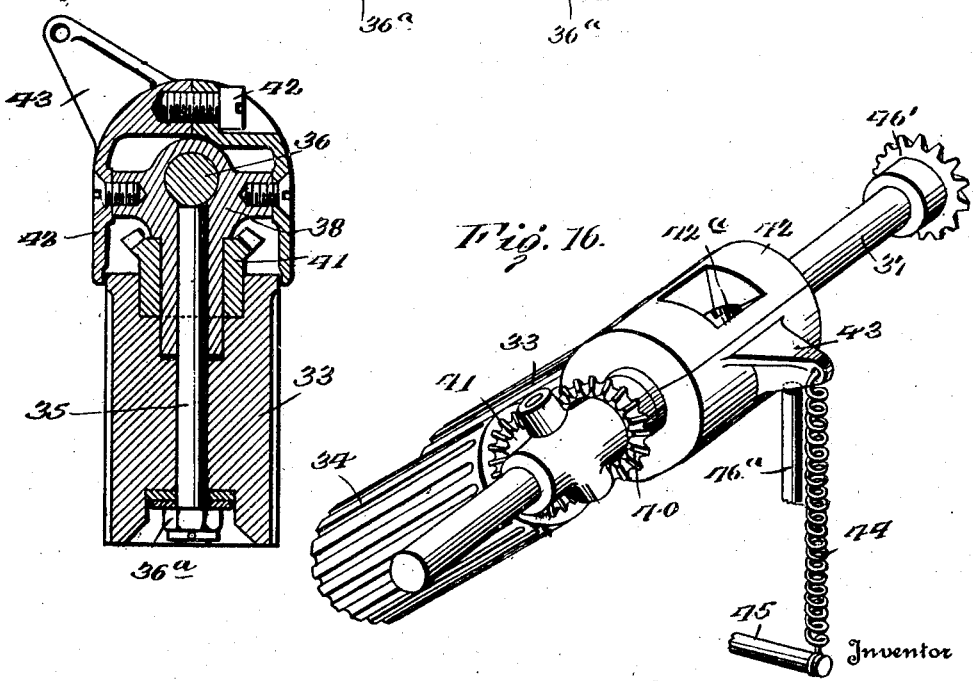

Nov. 10, 1925.

R. COVER

MACHINE FOR DEBUTTING CORN

Filed Sept. 20, 1918

Inventor
Ralph Cover

Witness
By Sturtevant & Mason
Attorneys

Nov. 10, 1925.  
R. COVER  
1,560,977  
MACHINE FOR DEBUTTING CORN  
Filed Sept. 20, 1918   16 Sheets-Sheet 13

Witness:  
Albert Popkins

Inventor  
Ralph Cover  
By Sturtevant & Mason  
Attorneys

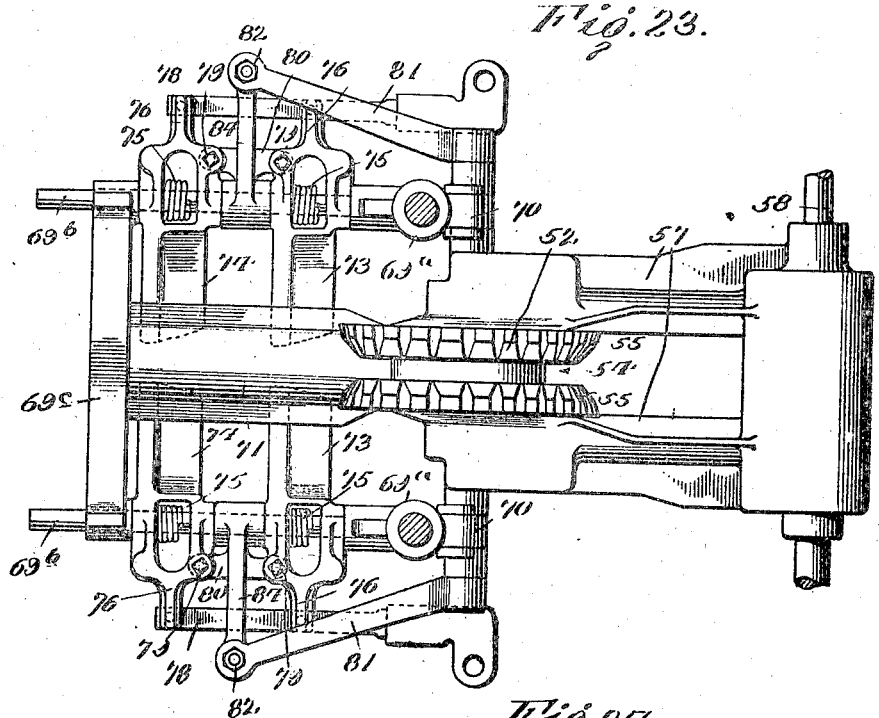

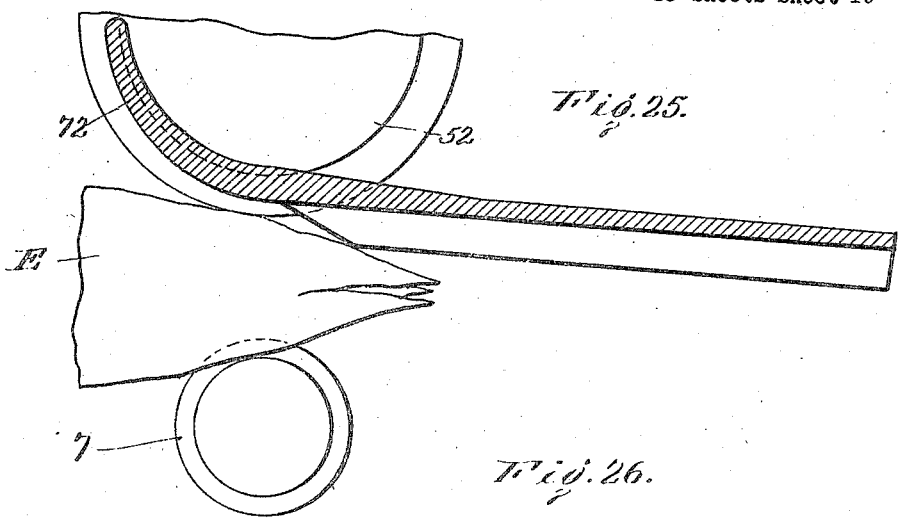
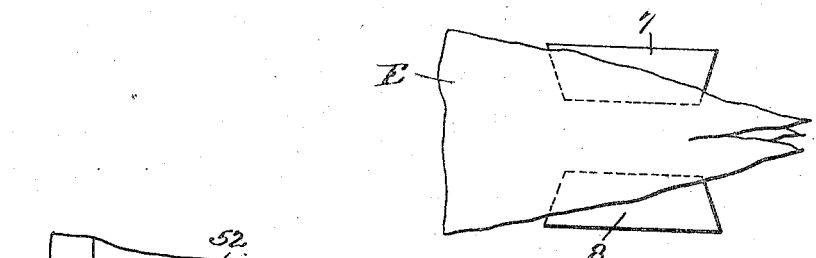
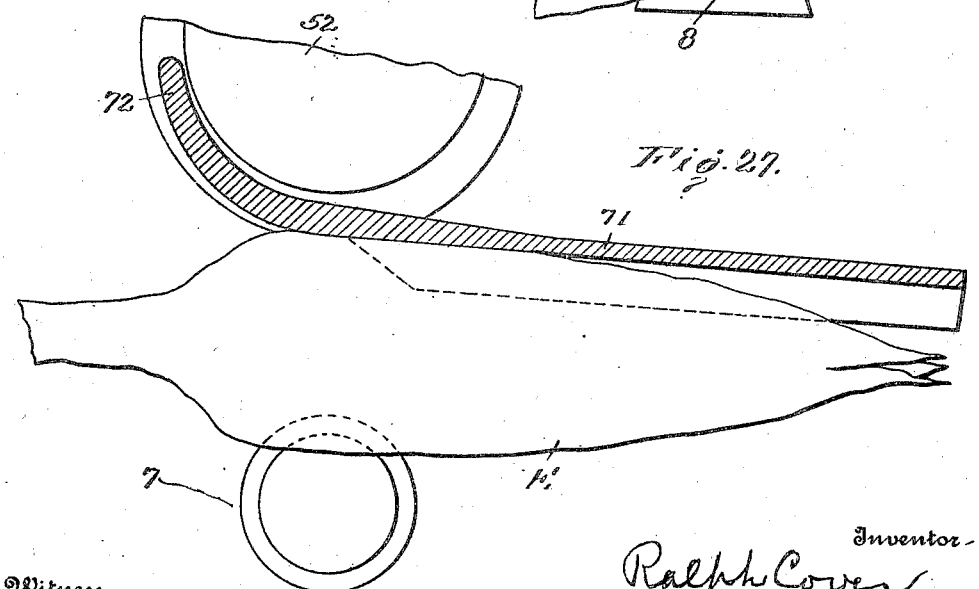

Nov. 10, 1925.

R. COVER

MACHINE FOR DEBUTTING CORN

Filed Sept. 20, 1918

Witness
Albert Popkins

Inventor
Ralph Cover
By Sturtevant & Mason
Attorneys

Patented Nov. 10, 1925.

1,560,977

UNITED STATES PATENT OFFICE.

RALPH COVER, OF WESTMINSTER, MARYLAND, ASSIGNOR TO THE UNITED MACHINERY COMPANY, OF WESTMINSTER, MARYLAND, A CORPORATION OF MARYLAND.

MACHINE FOR DEBUTTING CORN.

Application filed September 20, 1918. Serial No. 254,989.

*To all whom it may concern:*

Be it known that I, RALPH COVER, a citizen of the United States, residing at Westminster, in the county of Carroll, State of Maryland, have invented certain new and useful Improvements in Machines for Debutting Corn, of which the following is a description, reference being had to the accompanying drawing and to the figures of reference marked thereon.

The invention relates to new and useful improvements in machines for debutting corn, and more particularly to a machine of the type shown in the application of William H. Leister, Serial No. 192,367, filed September 20, 1917.

In the machine of this application the ear of corn is alined for presentation to the cutting devices for debutting the ear by alining devices which are spaced but have a fixed position relative to each other. The ear of corn passes over these alining devices point first and in endwise direction, so that the grain shoulder is approached by the alining devices from the direction of the body of the ear. This greatly facilitates the finding of the real grain shoulder and the positioning the ear thereby, so that the butt will be severed close to the grain shoulder and without cutting into the ear of corn so as to waste the same. Ears of corn vary greatly in diameter and with ears of extreme sizes there is some difficulty in properly alining the ear by alining devices which have a fixed position relative to each other.

An object of the present invention is to provide alining devices for the ears of corn which are capable of being shifted away from and toward each other to vary the capacity of the alining devices for different size ears of corn and in providing a vertically movable cross-head which is lifted by the ear of corn as it passes over the alining devices, which vertically movable cross-head controls the position of the alining devices—setting the same so as to handle efficiently the particular size of ear passing through the machine and lifting the cross-head.

A further object of the invention is to provide a presser wheel and presser plate underneath which the ear travels and which are raised by the ear, the amount depending upon the size of the ear, and which in turn control the movements of the cross-head and the setting of the alining devices.

A further object of the invention is to provide retarding plates which are adapted to engage the ear and hold the grain shoulder against the alining devices, which retarding plates are shifted toward and from a cooperating top presser plate to correspond with the size of the ear passing through the machine.

A still further object of the invention is to provide a debutting machine having alining devices with cooperating retarding plates and a presser plate, which are disposed so as to engage the ear at three spaced points about the circumference of the ear and which operate thereby to center the ear and control the same while it is being positioned by the alining devices.

A still further object of the invention is to provide a debutting machine having mechanism for controlling and alining the ears relative to cutting devices, with feeding in rolls which are inclined to each other, so as to form a guiding trough for the ear, together with means for positively rotating the rolls.

A still further object of the invention is to provide a yielding means for supporting the feeding in rolls, so that they may readily yield to permit the projecting stalk or stem of the ear to pass by the same on the downward movement of the ear to alined and cutting position.

A still further object of the invention is to provide feeding in rolls of the above character which are uniform in diameter throughout, so that ears varying in size may all be fed at a uniform rate regardless of their point of contact with the feeding in rolls.

Still another object of the invention is to provide feed chains for conveying the ear from alined position to the cutting position, which feed chains are independently and yieldingly mounted so that the chains may properly cooperate with ears of various shapes and lengths.

These and other objects will in part be obvious and will in part be hereinafter more fully disclosed.

In the drawings which show by way of illustration one embodiment of the invention—

Figure 8 is a view partly in horizontal section and partly in top plan showing more particularly the alining devices, the feeding in rolls and the means for operating the same, and also the retarding or restraining devices for the ear;

Figure 13 is a view partly in section and partly in top plan showing the severing devices;

Figure 14 is a sectional view on the line 14—14 of Figure 13;

Figure 15 is a section through the feeding in rolls at one side of the machine;

Figure 16 is a perspective of the feeding rolls at one side of the machine and the supporting and operating shaft therefor;

Figure 17 is a section through one roll at right angles to its supporting and operating shaft;

Figure 23 is a plan view of the presser wheel, the presser plate and the retarding devices;

Figure 24 is a side view of the same, showing also a portion of the feed chains;

Figure 25 is a view showing more or less diagrammatically the alining devices and the presser means cooperating therewith just as the point of an ear enters between the same;

Figure 26 is a diagrammatic view showing the alining devices with the ear in the position shown in Figure 25;

Figure 27 is a view similar to Figure 25, but showing the ear well advanced between the alining devices and the presser means;

The invention relates particularly to a debutting machine having alining devices over which the ear passes point first in order that the grain shoulder may be approached from the body of the ear. These alining devices are spaced so that the points of contact between the ear and the alining devices will be at the grain shoulder of the ear. Said alining devices are positively rotated, both in the same direction and are mounted so that they may be moved toward and from each other. Preferably spring means are provided for pressing the alining devices toward each other, while positive means is provided for moving the same away from each other. The purpose of moving the alining devices is to vary the distance between the points of contact between the ear and the alining devices, so as to correspond with the grain shoulder of the ear.

The invention in one of its phases is directed to the means for varying the distance between these alining devices or the capacity of the alining devices to correspond to the size of the ear being operated upon. In the present invention this is brought about by a vertically movable cross-head which is raised by the ears as they pass through the machine and this cross-head has rollers cooperating with cam levers which in turn operate to move the alining devices respectively away from each other, the springs returning the alining devices after the ear has passed the same. As a means for directing the ears through the machine, I have provided a presser wheel and a presser plate and also retarding plates. The presser plate is secured to the cross-head. The presser wheel engages the upper face of the ear and is raised and lowered thereby and this presser wheel is mounted in a frame which is connected to the cross-head, so that the up and down movements of the wheel will impart up and down movements to the cross-head. The retarding plates are mounted on the cross-head, so as to move up and down therewith, but these plates have a movement independent of the cross-head brought about through the up and down movements of the presser wheel. These independent movements of the retarding plates shift the same to accommodate the ears of different sizes. The ears of corn are fed on to the alining devices by feed rolls, which are preferably inclined, so as to form a feeding in trough. These rolls are uniform in diameter; are positively driven and are yieldingly mounted so that they may swing away from each other at their inner ends to permit projecting stalks or stems to pass between the same. The ears are conveyed from alined position to rotating debutting knives by feed chains. There are two pairs of feed chains and each feed chain is independently and yieldingly mounted.

Figure 7:
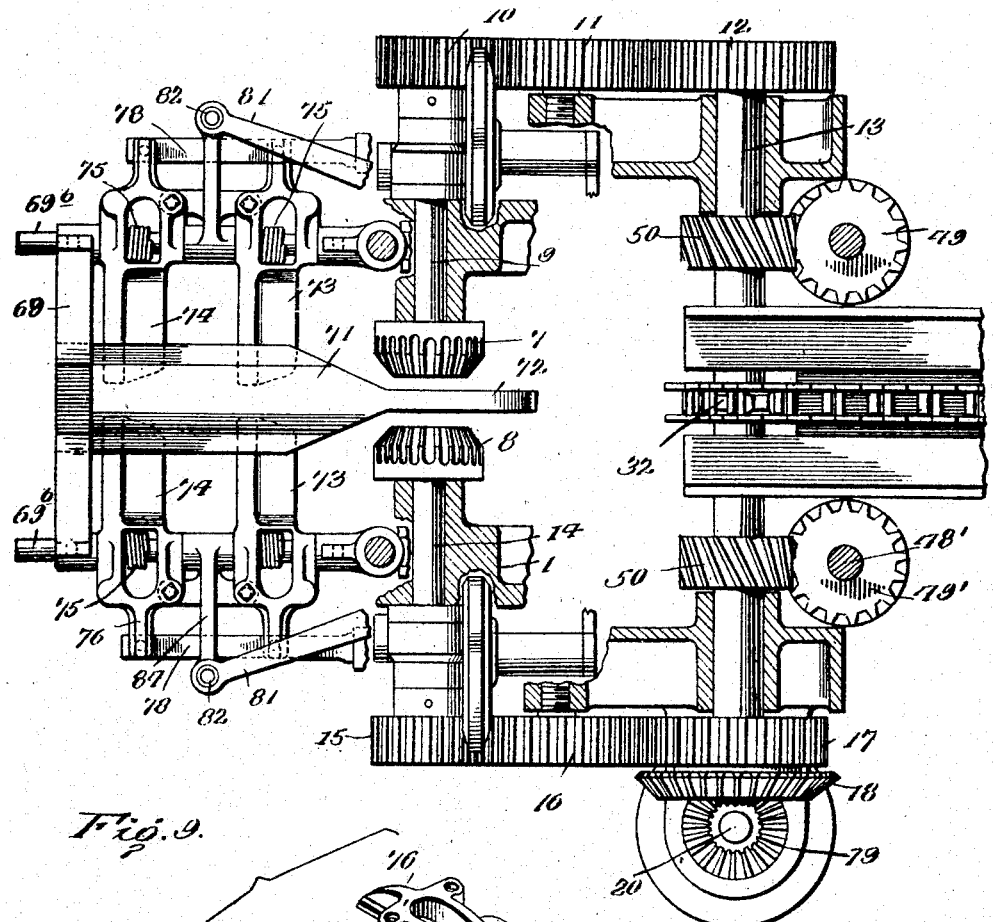
Figure 7 is a view partly in horizontal section and partly in top plan showing the alining devices and the means for operating the same, also the presser plate and the restraining means for receiving the ear and holding the same in engagement with the alining devices.
Figure 9:
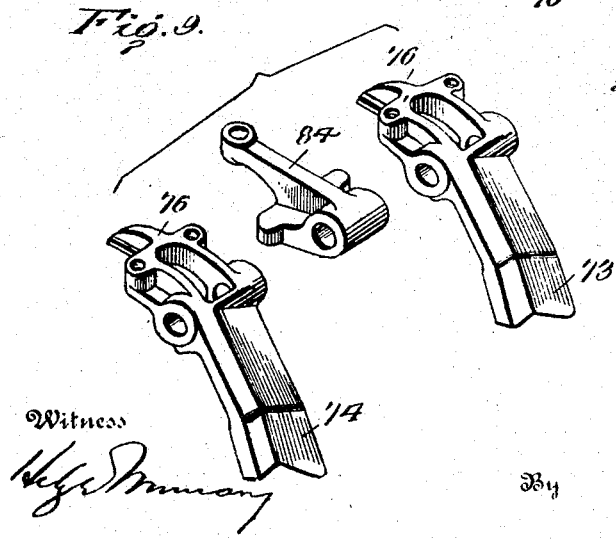
Figure 9 is a detail in perspective showing two of the retarding devices and the arm for shifting the same.

In the drawings, I have shown a machine for carrying out the broad principles of our invention. It is to be understood, however, that the invention may be embodied in other types of machines and in other mechanisms varying greatly in details from that herein shown, the illustration being purely for the purpose of showing one way of carrying out the invention. Referring to these drawings in detail, I have shown the invention as embodied in a machine having a supporting frame 1, in which is mounted a main driving shaft 2. This driving shaft is operated by a belt from any suitable source of power. Associated with the driving pulleys of the main shaft 2 is a belt shifter 4 operated by a shaft 5 and a hand lever 6. It is understood, of course, that these parts may be of any desired construction. Mounted in the main frame 1 is a pair of alining devices 7 and 8. The alining device 7 is carried by a shaft 9, which is mounted to slide endwise in the frame 1. On the outer end of the shaft 9 is a gear wheel 10, which is keyed to the shaft and this gear wheel 10 meshes with an intermediate gear wheel 11, which in turn meshes with a gear wheel 12 on a shaft 13 (see Figure 7). The alining device 8 is carried by a shaft 14 which is also mounted so as to slide endwise in the frame 1. Keyed to this shaft 14 is a gear 15 which meshes with an intermediate gear 16 and this intermediate gear meshes with a gear 17 also mounted on the shaft 13. The shaft 13 carries a bevel gear 18, which meshes with a bevel gear 19 on a vertical shaft 20. The vertical shaft 20 carries a bevel gear 21 at its lower end which meshes with a bevel gear 22 on the main shaft 2. The shaft 20 is made in two sections which are coupled together by a multiple disk friction clutch 22' (see Figure 4 of the drawings). This multiple disk clutch is held closed by a spring 23 which bears against a fixed collar 24 secured to the lower section of the shaft 20 and against a movable collar 25, which is a part of the clutch mechanism. This spring causes the disks of the clutch to yieldingly engage each other so that the motion of the main shaft will be imparted to the upper section of the shaft 20 and thus to the shaft 13 operating the alining devices. The other parts of the machine are also operated from this shaft 13. If for any reason the parts operated by the shaft 13 become locked, then the friction clutch 22' will slip, thus preventing any bending or breaking of the parts operated by the shaft 20. It is understood, of course, that the spring 23 and the multiple disk clutch controlled thereby ordinarily turns the upper section of the shaft 20 as one with the lower section of the shaft.

The ears of corn are fed over the alining devices 7 and 8 point first. The ears are placed on a receiving table 26. This receiving table is provided with a bottom portion 27 and side portions 28 (see Figure 4 of the drawings). The receiving table is mounted on a bracket 29 which is bolted to the frame 1 of the machine by suitable bolts. Sliding along the bottom 27 of the receiving table is a feed sprocket chain 30. Said sprocket chain travels over a roll 31 at the outer end of the table and over a sprocket wheel 32 mounted on the shaft 13. This sprocket chain is positively driven and in a direction so as to slide along the table 26 and convey ears to the alining mechanism. It is understood that the ears may be placed by hand or otherwise on this feeding in table and are placed with their points forward, so that they will be carried point first over or into the alining mechanism. The ear of corn after the grain shoulder reaches the alining devices is carried forwardly and downwardly to full alined position and then is clamped by feed chains and carried to the severing or debutting mechanism. The projecting stalk or butt extending rearwardly from the body of the ear passes down between the alining devices. In order to provide a free space for the downward movement of this projecting stalk or butt, the table 26 terminates at a point a considerable distance back from the alining devices, as clearly shown in Figure 7 of the drawings.

As a means for feeding the ear from the table to the alining devices, I have provided a plurality of pairs of feeding rolls 33—33 and 34—34. These rolls are positively operated and receive the ear which is moved on to the same by the feed chain, and as the rolls turn they will carry the ear on to the alining devices 7 and 8. It will be noted that the feeding in rolls 33 and 34 are similar in construction and of uniform diameter throughout. The rolls 33 and 34 at one side of the machine are carried by a shaft 36, while the rolls 33 and 34 on the other side of the machine are carried by a shaft 37. Journaled loosely on the shafts 36 and 37, respectively, is a T-head or bracket 38 for each roll. This T-head has a downwardly extending sleeve 39, which receives a fixed shaft or rod 35 on which each roll is supported. At the lower end of the shaft or rod 35 is a nut $36^a$ for holding the roll on the shaft. The roll is recessed to receive the sleeve 39. Keyed to the shaft 36 is a beveled gear 40 for each roll. This beveled gear 40 meshes with a beveled gear 41. The beveled gear 41 is supported by the sleeve 39 and is provided with notches which receive clutch pins $36^b$ carried by each roller. In this manner each roller is locked to its respective beveled gear 41, which in turn is in mesh with the beveled gear 40 which operates the roll.

As above noted the rolls are operated on one side of the machine from the shaft 36 and from the other side of the machine from the shaft 37. Extending about the beveled gear 40 and also about the beveled gear 41 is a housing 42 which is formed in sections secured together by a bolt $42^a$. Extending outwardly from this housing is an arm 43. A spring 44 is secured at its upper end to the arm 43 and at its lower end to a bar 45 attached to the frame of the machine. This spring normally pulls the arm 43 downwardly until it rests against the stop $46^a$. When in this position the rolls 33 and 34 are inclined to each other, forming, in a sense, a trough which receives the ear from the sprocket chain. The feed rolls convey the ears to the alining device and presser wheel.

The feeding in rolls may readily yield downwardly putting the springs 44 under tension. This permits the stalk or butt of the ear to pass down between the rolls if extremely long, as the ear moves downwardly with the alining devices and as soon as the butt or stalk of the ear passes, the rolls will at once spring back to their normal position. Inasmuch as the rolls are uniform in diameter throughout, the ear will be fed forward at a uniform speed regardless of the size of the ear or the point of contact between the ears and the feeding in rolls.

The shaft 36 carries a bevel gear 46 which meshes with a bevel gear 47 on a vertical shaft 48. This vertical shaft 48 is provided with a spiral gear 49 which meshes with a spiral gear 50 on the shaft 13. The shaft 37 is provided with a similar bevel gear 46' meshing with a bevel gear 47' on a vertical shaft 48'. This vertical shaft 48' carries a spiral gear 49' meshing with a spiral gear 50' on the shaft 13. Thus it will be seen that the feed rolls 33 and 34 are all positively rotated and yet said rollers will yield bodily to permit the stalk or butt to pass down between the same, as above noted. This insures that the ear of corn will be caused to travel continuously after it is placed on the feed table until it is brought to alining position. Even though the ear be extremely short, it will not stop, but will be positively moved along by the feeding mechanism.

Figure 2:
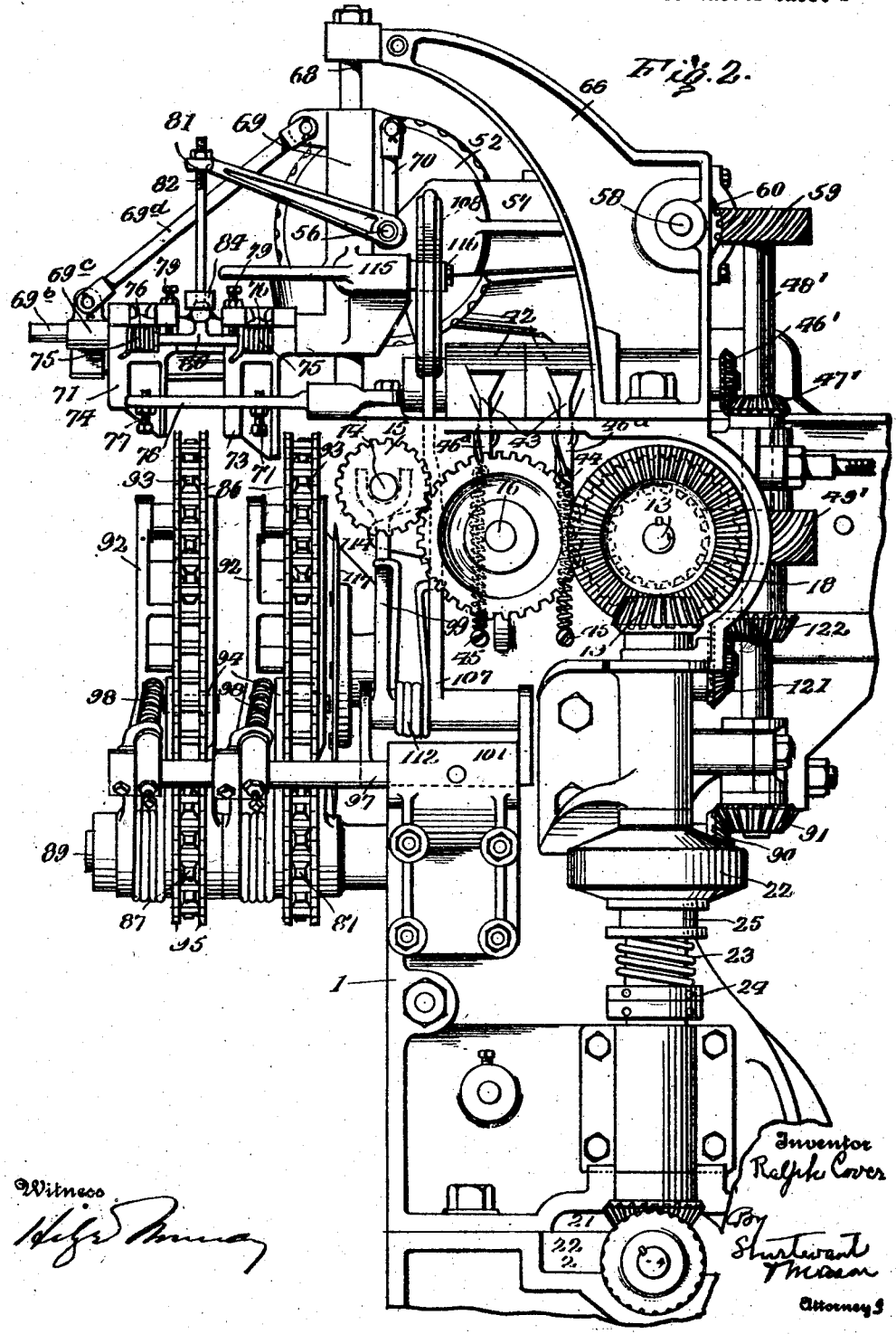
Figure 2 is an enlarged side view of a portion of the machine viewed from the opposite side from that shown in Figure 1, the head being raised.
Figure 11:
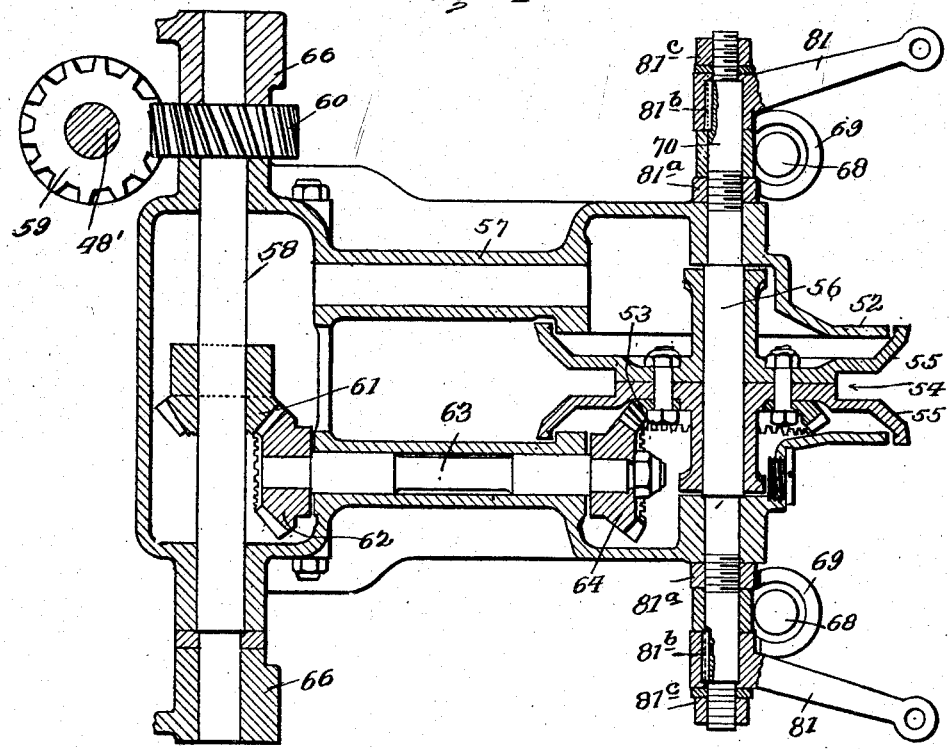
Figure 11 is a view in horizontal section but showing the manner of mounting and operating positively the presser wheel which bears on the ear of corn as it passes from the alining devices
Figure 12:
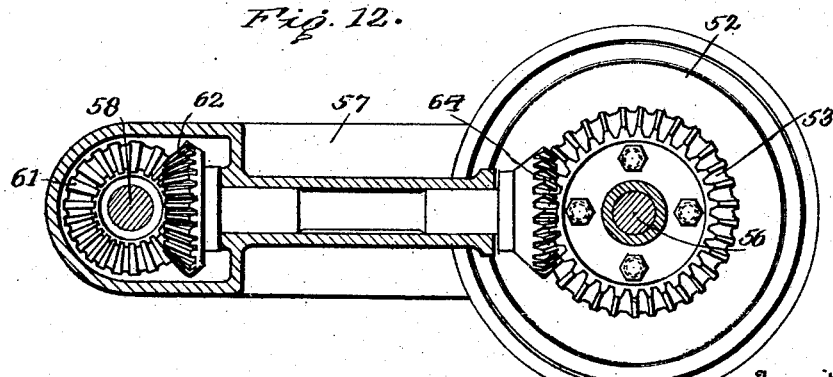
Figure 12 is a sectional view on the line 12—12 of Figure 11.

Located directly above the alining devices 7 and 8 is the presser wheel 52. This presser wheel, as clearly shown in Figure 11 of the drawings, is formed in two parts bolted together and fixed to the presser wheel is a bevel gear 53. Between the two parts of the wheel there is a space 54 and the extreme outer edge of the wheel are beveled, as at 55. The presser wheel 52 is freely mounted on a shaft 56. This shaft 56 is fixed to a frame 57, which is mounted to turn about a shaft 58. The shaft 48' is extended above the devices for operating the feeding in rolls and carries a worm gear 59. This worm gear 59 meshes with a worm gear 60 on the shaft 58. Mounted on the shaft 58 is a bevel gear 61, which meshes with a bevel gear 62 on the cross shaft 63 and this cross shaft 63 carries a bevel gear 64 meshing with the bevel gear 53. Through this train of mechanism the presser wheel 52 is positively rotated in a clockwise direction, as viewed in Figure 2 of the drawings. The frame 57 carrying this presser wheel freely pivots about the shaft 58, so that it may be swung up and down on the shaft.

Figure 3:
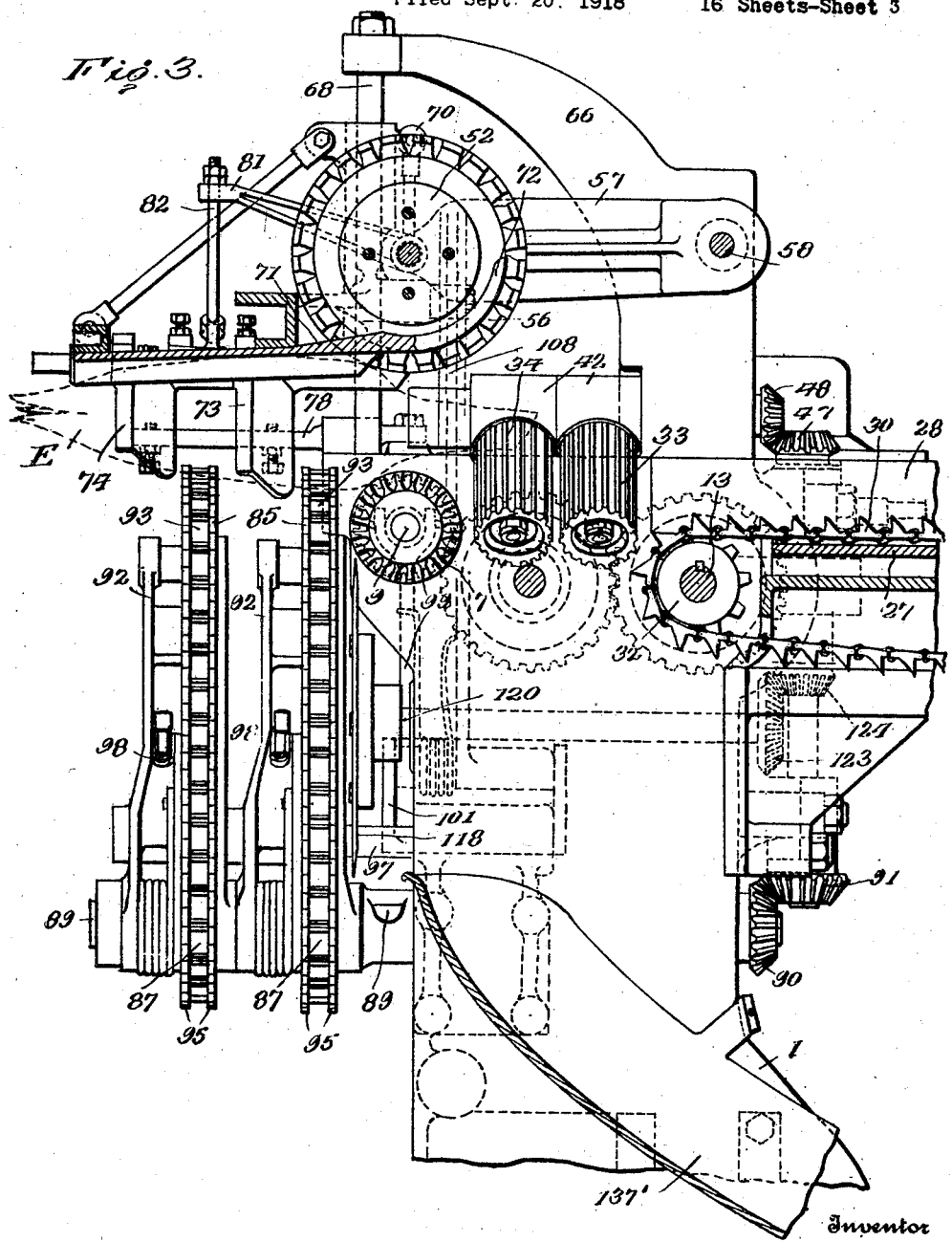
Figure 3 is a vertical sectional view centrally through the machine and viewed from the same position shown in Figure 2.

Mounted on the main frame 1 of the machine is a pair of brackets 66, one at each side of the machine. These brackets are connected by a cross beam 67 (see Figure 4 of the drawings). Mounted in the ends of the brackets are vertical standards 68. Mounted to slide on these vertical standards is a cross head 69. This cross head includes spaced vertical sleeves $69^a$, spaced horizontal rods $69^b$, a cross beam $69^c$ at the outer ends of the rods $69^b$ and braces $69^d$ connected to the cross beam and to the vertical sleeves 69ᵃ and serving to support the outer ends of the rods 69ᵇ. Links 70 are pivoted to the members 69ᵃ of this cross head and also pivoted to the frame 57, so that as the presser wheel moves up and down by reason of the ear passing underneath the same, this cross head will be raised and lowered. Mounted on the cross head is a presser plate 71. Said presser plate is bolted at its outer end to the cross beam 69ᶜ and is also connected to the central member of said cross head. The presser plate 71 is formed with a rearwardly projecting guide finger 72, which is curved to conform to the center of rotation of the presser wheel and extends into the recessed portion 54 in said presser wheel. This presser plate moves up and down bodily with the presser wheel. It is rigidly attached to the cross head, as above noted, so that it does not rock but moves bodily vertically. The presser plate 71 is curved in cross section and the ear passing over the alining devices passes underneath the presser wheel 52 and this presser plate 71. In Figure 3 I have shown in dotted lines the ear underneath the presser plate and just reaching its alined position on the alining devices.

Figure 4:
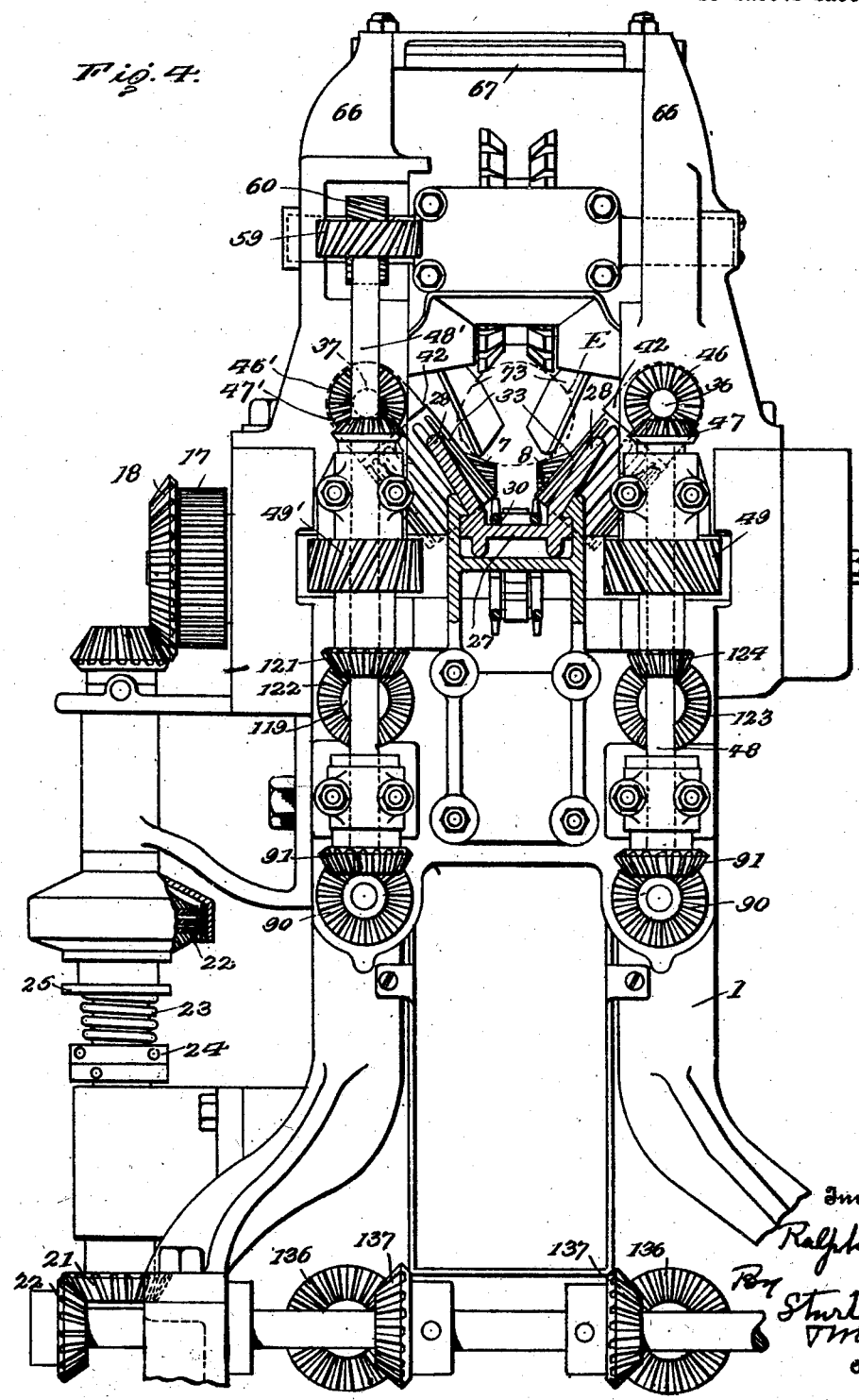
Figure 4 is a view partly in vertical section and partly in end elevation of the machine from the receiving side thereof with an ear partway over the alining devices.
Figure 5:
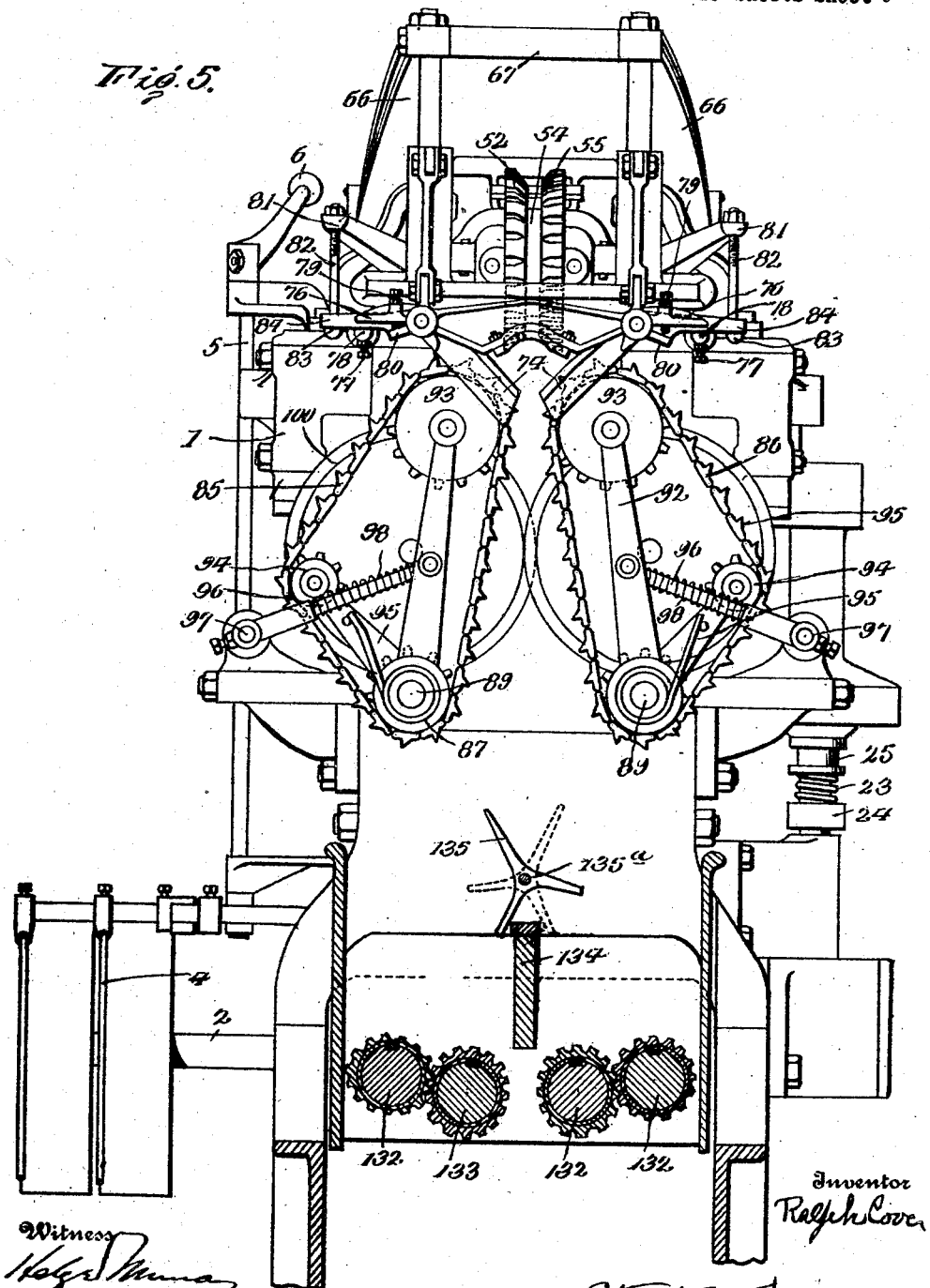
Figure 5 is a view partly in section and partly in end elevation of the machine from the delivery side thereof.
Figure 6:
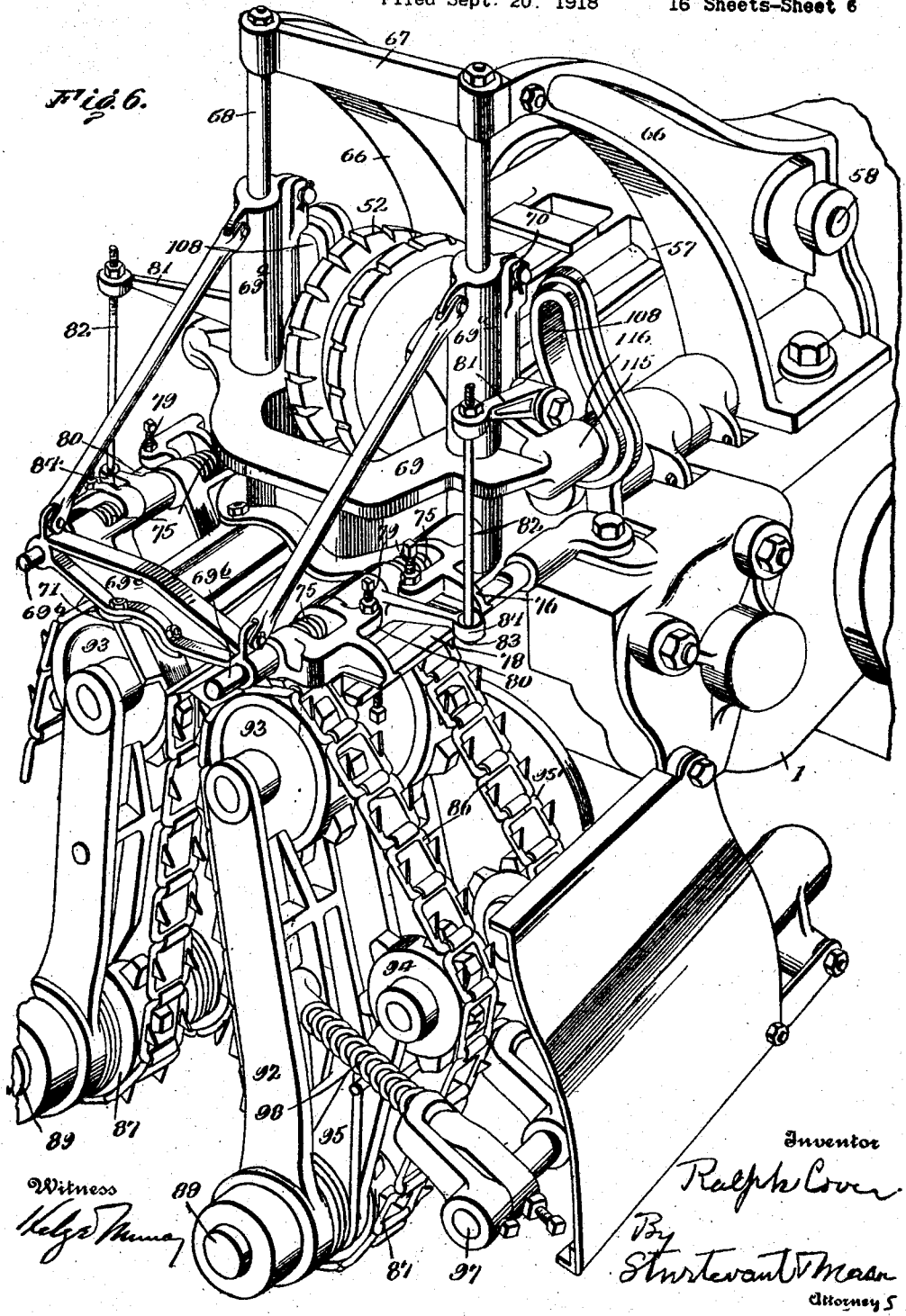
Figure 6 is a perspective view of a portion of the head of the machine, showing more particularly the presser wheel, the cams for positioning the alining devices and the means operated thereby and the feed chains for conveying the ear to the severing means.
Figure 18:
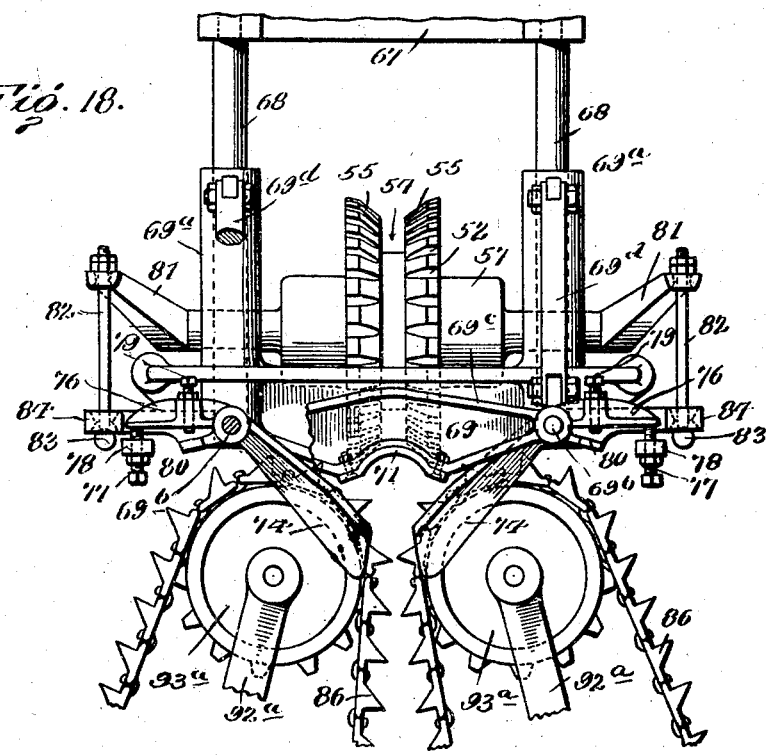
Figure 18 is an end view of a portion of the machine with the part positioned as before ear enters.
Figure 19:
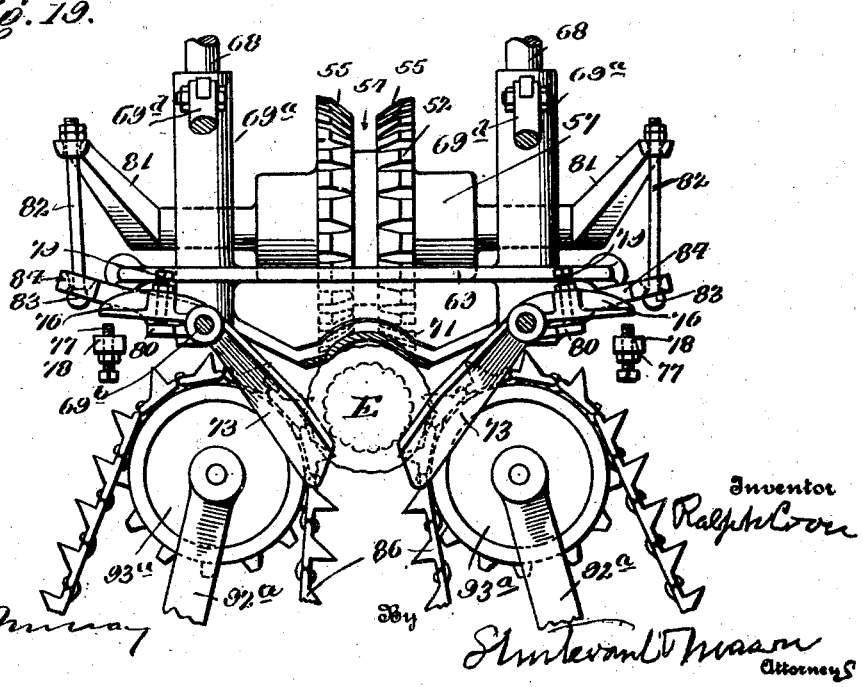
Figure 19 is a similar view but showing an ear passing through the machine.

Also carried by the cross head 69 are restraining or retarding plates 73 and 74. These retarding plates are pivotally supported by the horizontal rods 69ᵇ, respectively, of the cross head 69, so that they may swing thereon. They are also inclined, as shown in Figure 4, so that the ear passes above the retarding plates and underneath the presser wheel and presser plate 71. The retarding plates 73 and 74 are freely pivoted on the cross head. Springs 75 operate upon these retarding plates to normally raise the same until arms 76 carried by each plate engage limiting stops. When the cross head is in its extreme lowest position, as shown in Figure 5 of the drawings, these arms 76 rest on adjustable screws 77 carried by the frame of the machine. Said screws are preferably mounted on a bracket rod 78, one at each side of the machine. When the cross head is raised then the spring will turn these retarding plates about their pivotal supports, raising the inner ends thereof until the screws 79 engage stops 80 carried by the cross head. Rigidly fixed to the frame 57 at each side of the machine is an arm 81. Each arm 81 is keyed to the shaft 56 by a key 81ᵃ. The shaft 56 is clamped to the frame 57 by nuts 81ᵇ and the arms are held on the shaft 56 by nuts 81ᶜ, respectively. (See Figure 11.) This arm moves up and down with the frame 57 and the end of the arm will, of course, swing about the shaft 58 as a center. Extending downwardly from the end of each arm is a rod 82, which has a ball 83 at the lower end thereof. This rod extends through a bracket arm 84 pivotally mounted on the cross head. The stops 80 referred to above as carried by the cross head are carried by these arms 84. The operation of these retarding plates in connection with the cross head is, as follows:

When the ear of corn passes underneath the presser wheel the presser wheel will be raised and this will lift the cross head. Before the ear enters the machine the parts are positioned as shown in Figure 18. On the first upward movement of the cross head the arm 76 carried by the retarding plates will be moved out of contact with the stop screws on the frame, and, as a result, the springs will swing the retarding plates until the stop screws 79 engage the limiting stops 80 (see Figure 19). A further upward movement of the cross head carries the pivotal support for the retarding plates upwardly. These retarding plates will move upwardly at the same rate of speed as the center of the presser wheel 52 as the cross head moves bodily vertically through the link connection 70 with the shaft carrying the presser wheel 52. The outer end of the arms 81, however, swinging about the shaft 58 as a center will move through a greater distance than the shaft carrying the presser wheel 52 and as a result the lower ends of the rods 82 will engage the arms 84 and lift the limiting stops 80 and through the screws 79 raise the outer ends and lower the inner ends of the retarding plates. Through this means the retarding plates are lowered an amount predetermined by the diameter of the ear passing underneath the presser wheel 52. In other words, an ear of a certain diameter passing underneath this presser wheel will raise it a fixed distance and this will lower the retarding plates a predetermined distance to insure the passage of the ear over the retarding plates. These retarding plates restrain the forward movement of the ears sufficiently to cause the grain shoulder to seat against the alining devices and together with the downward pressure of the presser plate and presser wheel will crush the more or less loose husks so as to insure that the actual grain shoulder of the ear will be brought firmly against the alining surfaces of the alining devices and the ear positioned thereby.

Figure 20:
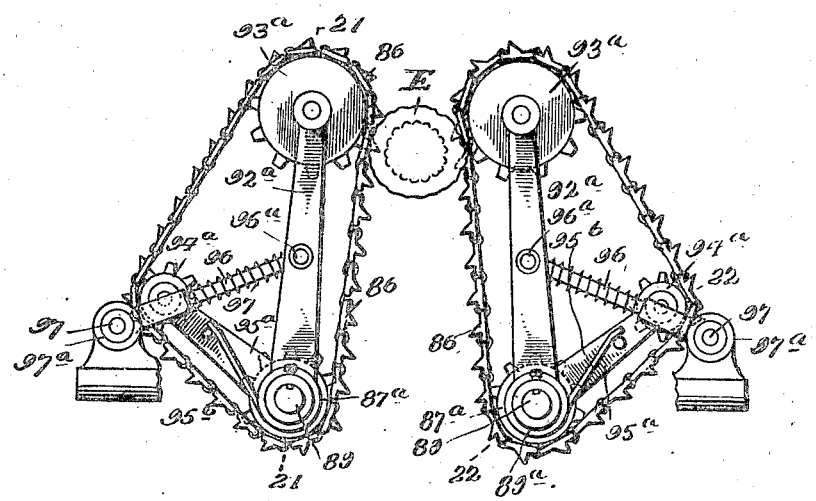
Figure 20 is an end view of the feeding chains and the supporting devices therefor.
Figure 21:
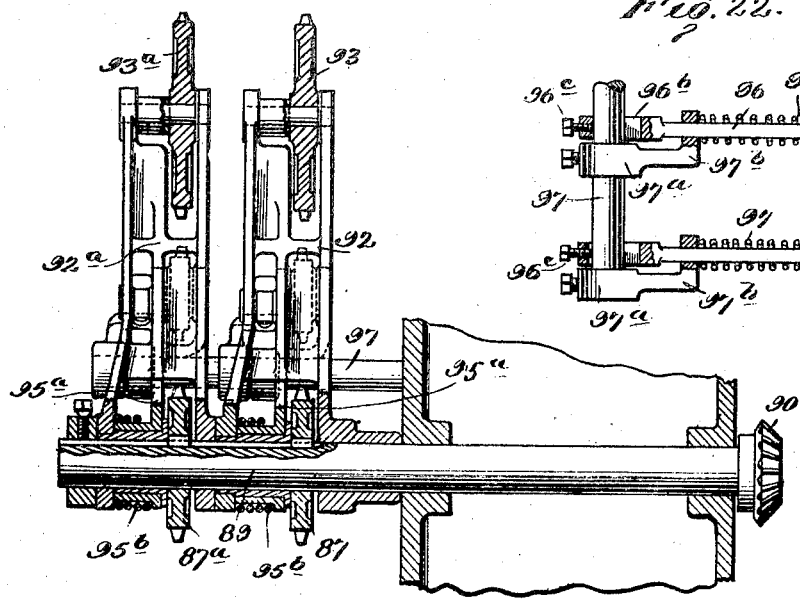
Figure 21 is a sectional view on line 21—21 of Figure 20.
Figure 22:
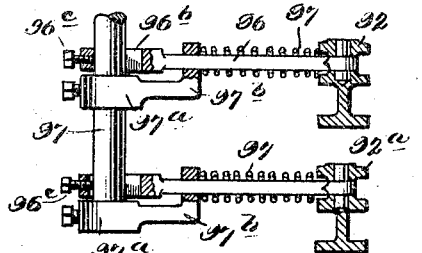
Figure 22 is a sectional view on line 22—22 of Figure 20.

The ears are fed to the severing devices by feed chains 85 and 86, see Figures 20, 21 and 22 of the drawings. There are two cooperating feed chains 85 and two cooperating feed chains 86. These feed chains are similar in construction and are similarly mounted and operated at each side of the machine by the same train of mechanism. The feed chains 85 run over sprocket wheels 87 mounted on shafts 89, respectively, and these shafts carry beveled gears 90, which mesh with beveled gears 91 on the vertical shaft operating the feed rolls and also operating the presser wheel 52. The feed chains 86 run over sprocket wheels 87ª, also mounted on the shafts 89, respectively. Mounted to swing freely on each shaft 89 is a frame 92, at the upper end of which is a sprocket wheel 93. The feed chains 85 run over the respective sprocket wheels 93. There is also an idler 94 carried by an arm 95, which engages each sprocket chain and tends to keep the respective chains taut. Mounted to turn loosely on each shaft 89 is a second frame 92ª which carries a sprocket wheel 93ª for the respective sprocket chains 86. An idler 94ª carried by an arm 95ª engages each chain 86 and keeps the same taut. Associated with each arm 95 and 95ª is a spring 95ᵇ which tends to turn these arms in a direction to hold the idlers against the chains and the chains under tension. The arms 95 and 95ª are mounted to turn freely on sleeves carried by the shafts 89. Each feed chain is provided with feed teeth 95ᶜ which project outwardly from the chains. The frames 92 and 92ª are swung toward each other yieldingly and their inward movement is limited. This is accomplished by providing a rod 96 for each frame. These rods are pivoted to the frames 92 at 96ª. Mounted on each supporting frame are rods 97, one at each side of the machine. Secured to the rod 97 is a sleeve 97ª, one for each rod 96. Extending outwardly from the sleeve 97ª is an arm 97ᵇ, which is bent laterally and provided with an opening through which the rod 96 extends. A spring 97ᶜ encircles this rod 96 bearing at one end against the frame and at the other end against the arm 97ᵇ. The rod 96 at its inner end is provided with a collar 96ᵇ, which has an elongated opening through which the rod 97 extends. It also carries a screw 96ᶜ which is adapted to bear against the rod 97 and limit the outward movement of the rod 96 through the action of the spring 97ᶜ. The springs operate to move the frames 92 and 92ª toward each other and the rod 96 limits their inward movement. The extreme inner position of the arms may be varied by adjusting the screws 96ᶜ.

From the above, it will be apparent that the feed chains 85 are pressed toward each other yieldingly and likewise the feed chains 86 are pressed toward each other and these pairs of feed chains may yield independently. As a result, if the ears are sufficiently long, both pairs of feed chains will engage the ear even though the diameter of the ear at the points engaged by the two chains varies. Furthermore, one pair of chains only may engage a short ear, and in order to accomplish this result it may be set close to the cutting knives.

The ears of corn, as above noted, lift the presser wheel and the presser plate and also the cross head. The retarding plates are depressed but are above the path of travel of the teeth on the feed chain. As the corn shoulder passes over the center of the alining devices the ear will gradually move downwardly lowering the cross head. If the ear is of sufficient diameter to hold the retarding plates open to a sufficient extent the teeth of the feed chains will engage the ear as it reaches the alined position, that is, a point where the grain shoulder is in a horizontal line with the axis of the shafts carrying the alined wheels. This gripping of the ear will move it bodily downwardly and the retarding plates will yield to permit the ear to pass between the same. If, however, the ear is a very small ear so that the retarding plates are opened or shifted relative to the cross head to a very limited extent, then when the cross head descends the stops 77 will engage the arms 76 and turn the retarding plates about their pivotal supports sufficiently to cause the teeth of the feed chains to pass above their upper surfaces, engage the ear and feed it to the severing devices.

I will now describe the means for positioning or setting the alining devices 7 and 8 for ears of corn of different diameters or sizes. As above noted the shafts 9 and 14 carrying the alining devices 7 and 8, respectively, are mounted so that they may be moved endwise in the supporting frame 1. The trains of mechanism for moving these shafts endwise are similar in construction each train of mechanism includes an arm 99 which is freely pivoted on a rod 100 carried by a bracket 101 secured to the frame. This arm 99 is formed with a yoke 102 at its upper end which yoke is provided with pins 103 adapted to engage a collar 104 loosely mounted between collars 105 and 106 secured to the shafts carrying the alining devices. The collar 104 is free on the shaft so that the shaft may rotate in this collar but the arm 99 will determine the endwise position of the shaft. In other words, as the arm 99 moves back and forth the shaft to which it is connected will be moved endwise. Also loosely mounted on the rod 100 is a lever 107 which is formed with a cam slot 108 at its upper end. The lever 107 is provided with an arm 109 carrying a pin 110 which is adapted to engage a shoulder 111 on the arm 99. As viewed in Figure 10 of the drawings, when the lever 107 is moved to the right this pin 110 will engage the shoulder 111 and move the shaft 14 to the right. The lever 107 at the opposite side of the machine will be moved to the left as the cam slot 108 is oppositely formed from that shown in the lever at the right of this figure, so that the shafts 9 and 14 will be moved by these levers 107 in opposite directions. A spring 112 is coiled about the rod 100 and one end of said spring bears at 113 against the lever 107 and the other end bears at 114 against the arm 99. These springs are arranged so as to press the shafts 9 and 14, respectively, endwise and in a direction to move the alining rolls toward each other The cross head 69 is provided with arms 115 carrying rollers 116 which engage the cam slots 108. As this cross head is raised these rollers operating upon the cam slots will operate to shift the shafts 9 and 14 endwise so as to move the alining devices 7 and 8 away from each other. The distance that these alining devices are moved depends upon the diameter of the ear of corn passing underneath the presser wheel and the extent to which said ear of corn lifts said presser wheel 52. Thus it will be seen that the alining devices will be set or positioned for alining an ear by the ear itself. When the cross head drops by reason of the ear passing downwardly as the grain shoulder follows around the alining devices, the levers 107 will be moved inwardly or toward each other, but owing to the yielding connection in the spring 112 between these levers and the arms 99, the devices 7 and 8 will not move in until the ear of corn is freed from engagement therewith. In other words, after the alining devices are once set for a given size ear they remain substantially in this set position until the ear has been fully alined thereby and has been fed on to the severing means. It is understood, of course, that the gear wheels 10 have a sliding engagement with the gear wheel 11 and the extent of movement of the shaft 9 is not sufficient to move these gears out of mesh. The same is true of the gear wheels 15 and 16 operating the shaft 14.

Figure 10:
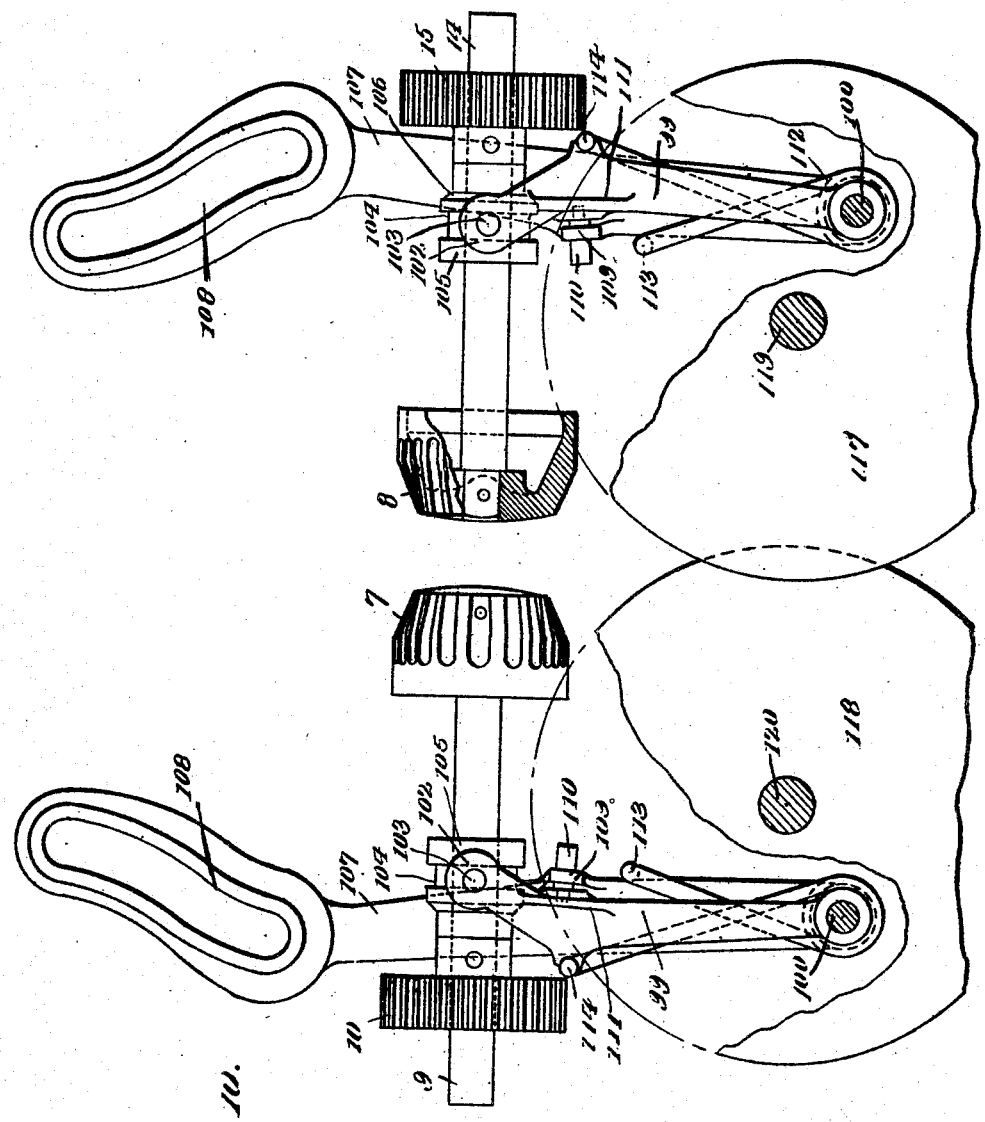
Figure 10 is a detail partly in section and partly in end elevation, showing the severing disks, the alining devices and the operating mechanism for positioning or setting the alining devices.

The butt is severed from the ear of corn by cooperating rotating severing devices 117 and 118 (see Figs. 10 and 13.) The severing device 117 is carried by a shaft 119, while the severing device 118 is carried by a shaft 120. The shaft 119 carries a bevel gear 121 which meshes with a bevel gear 122 mounted on the shaft 48'. The shaft 120 carries a bevel gear 123 which meshes with a bevel gear 124 carried by the shaft 48. The shaft 120 is preferably made in two sections 125 and 126, which have telescoping connection with each other. A spring 127 located within the section 125 bears at one end against the section 126 while the other end of the spring bears against an adjusting screw 128. This spring normally presses the cutting disk 118 outwardly and holds it in cooperative relation against the cutting disk 117. The section 125 is slotted at 129 and a pin 130 extended through the section 126 and into this slot 130, couples the two sections to the shaft so that they turn as one and a sleeve 131 holds the pin in place.

The operation of my debutting machine is thought to be obvious from the above description. The ears of corn are laid on to the feeding in table point first and are fed endwise by the feed chain running over the table onto the alining devices 7 and 8 and underneath the presser wheel 52. The presser wheel 52 and the alining devices are positively driven and the ear will be carried forward by these moving parts, the presser wheel running up onto the ear and lifting as the ear gradually passes underneath the same. The point of the ear passing underneath the presser wheel passes beneath the presser plate 71 and over the retarding plates 73 and 74. The lifting of the cross head causes the retarding plates to open or move downwardly from the presser plate, so as to ensure that the ear will enter above the plates, although the retarding plates engage the ear sufficiently to retard the forward movement thereof and hold the ear in proper contact with the alining devices. As the ear passes over the alining devices through the raising of the presser wheel 52, it will set the alining devices 7 and 8 a predetermined distance apart depending upon the diameter of the ear. The grain shoulder is approached by the alining devices having a relative movement along the body of the ear from the point toward the grain shoulder. Thus the presser wheel and the alining devices feel their way along the body of the ear more or less crushing and loosening the husks until the grain shoulder proper passes over the high point in the alining devices, when the husks immediately in rear thereof will be crushed and the grain shoulder will follow along with the movements of the rotating alining devices hugging tightly against the surface thereof. The ear now moves forwardly and downwardly until the grain shoulder reaches a horizontal line passing through the axis of the shafts carrying the alining devices. This is the extreme forward movement of the ear and this is the aligned position for the ear. As the ear begins its downward movement the cross head moves downward for the reason that the presser wheel and the presser plate move downward. This downward movement of the cross head carries the ear bodily downwardly until it is gripped by the feed chains. If the ear is a long ear it will be gripped at two points by the front and by the rear feed chains and as these feed chains travel together the ear will be bodily lowered without endwise movement to the severing devices. If the ear is a relatively small ear then the inner feed chains may possibly alone grip the ear and carry the same down to the severing mechanism. Inasmuch as two pairs of feed chains are used the inner chains may be placed quite close to the severing devices so as to insure the carrying of the ear forward after it is alined by a bodily movement without any tilting or inclining of the ear so as to insure that the butt will be severed in a plane at right angles to the longitudinal axis of the ear.

Figure 28:
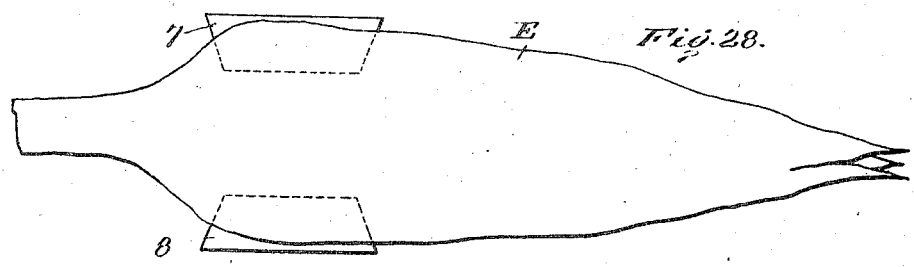
Figure 28 is a view similar to Figure 26, but showing the alining devices as having been separated or set for the ear of the size shown in Figure 27.
Figure 29:
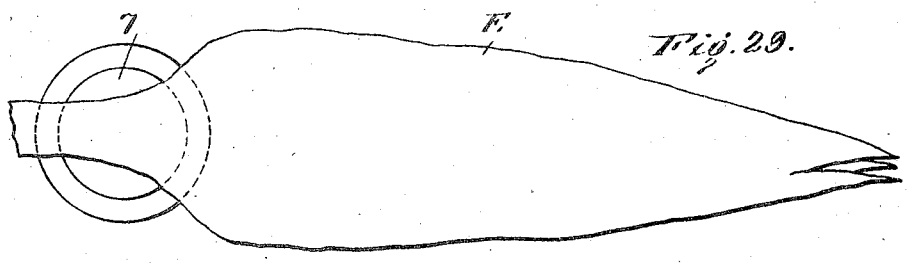
Figure 29 is a view showing diagrammatically the ear as fully positioned by the alining devices.
Figure 30:
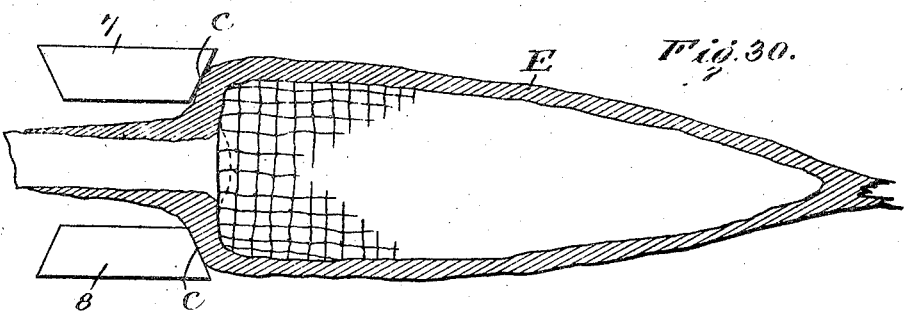
Figure 30 is a diagrammatic plan view of the ear in the position shown in Figure 29.

In Figures 25 to 31 of the drawings, I have shown more or less diagrammatically the operation of the ear on the alining devices and the setting of the alining devices for an ear of a given diameter. In Figures 25 and 26 the alining devices are in their normal innermost position and in this connection it will be noted that inasmuch as they are shifted from each other for larger ears they may be set relatively close together for very small ears. In order to perfectly aline an ear of corn it is essential that the grain shoulder shall engage the alining devices at points relatively near the inner faces of the respective alining devices. This will be apparent from Figure 30 of the drawings, from which it will be noted that the alining points on the alining devices are indicated at c. Therefore, the distance between the points c on the two alining devices should be substantially the same as the diameter of a circle containing the grain shoulder. In Figure 26 the alining devices are as above noted at their innermost position and the normal alining points on the alining devices, are, therefore, substantially the same distance apart as the diameter of a circle containing the grain shoulder. This would take care of an ear passing through the machine which practically did not raise the presser wheel to any extent. It is understood, of course, that the downward movement of the presser wheel is limited by the cross head coming in contact with the frame and the weight of the parts carry the presser wheel downwardly. Let an ear of any diameter greater than the smallest ear which could be taken care of by the machine pass underneath the presser wheel and the presser wheel will then be lifted as shown in Figures 27 and 28. This lifting of the presser wheel through the train of mechanism described above, moves the points c, c, which are the normal alining points of the alining devices, away from each other so that the distance now between these points is substantially the diameter of a circle containing the grain shoulder of an ear of the diameter indicated in these figures. As the grain shoulder follows along the alining devices being held snugly against the same by the retarding plates, the husks will be crushed and the grain shoulder brought against the alining devices. When the grain shoulder reaches the position shown in Figures 29 and 30, further forward movement of the ear ceases and the ear is perfectly alined for presentation to the severing devices. This shifting of the alining devices to correspond to the diameter of the circle containing the grain shoulder, may be referred to as varying the capacity of the alining means to correspond to the size of the ear being debutted, where, as a matter of fact, the setting of the alining devices according to the size of the ear operated upon, enables the alining devices to find the grain shoulder and aline the ear thereby, regardless of whether the ear is a small ear, a large ear or of intermediate size. In each instance the capacity of the alining means is varied to correspond to the particular ear that is at that instance being alined. It will be noted that the presser plate and retarding plates engage the ear at three points in the circumference thereof, which points are spaced and this results in the centering of the ear and the maintaining of perfect control thereof. It will also be noted that the cross head which controls the alining devices moves vertically and this gives a very easy and efficient movement to the controlling levers for the alining devices.

Figure 31:
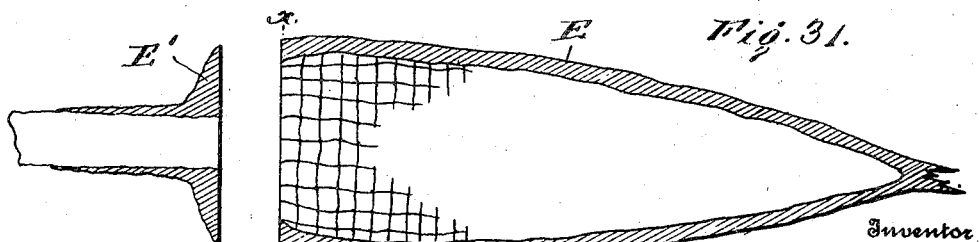
Figure 31 is a diagrammatic view showing the point at which the ear is debutted when properly alined.

It will be noted that the separating of the alining devices not only positions these alining devices so as to engage the grain shoulder for efficient positioning of the same, but this also permits a very large stalk or butt such as naturally is found on a large ear, to pass between the alining devices without any clogging of the machine. The feeding in rolls 33 and 34 yield to permit this butt or stalk to pass downwardly between the same. In Figure 31 of the drawings, we have shown the butt indicated at E', severed from the ear E, and it will be noted that the line x—x on which the ear is severed, is right at the grain shoulder of the ear, so that the husks are completely loosened from attachment with the butt of the ear, and at the same time the grain is not wasted.

Figure 1:
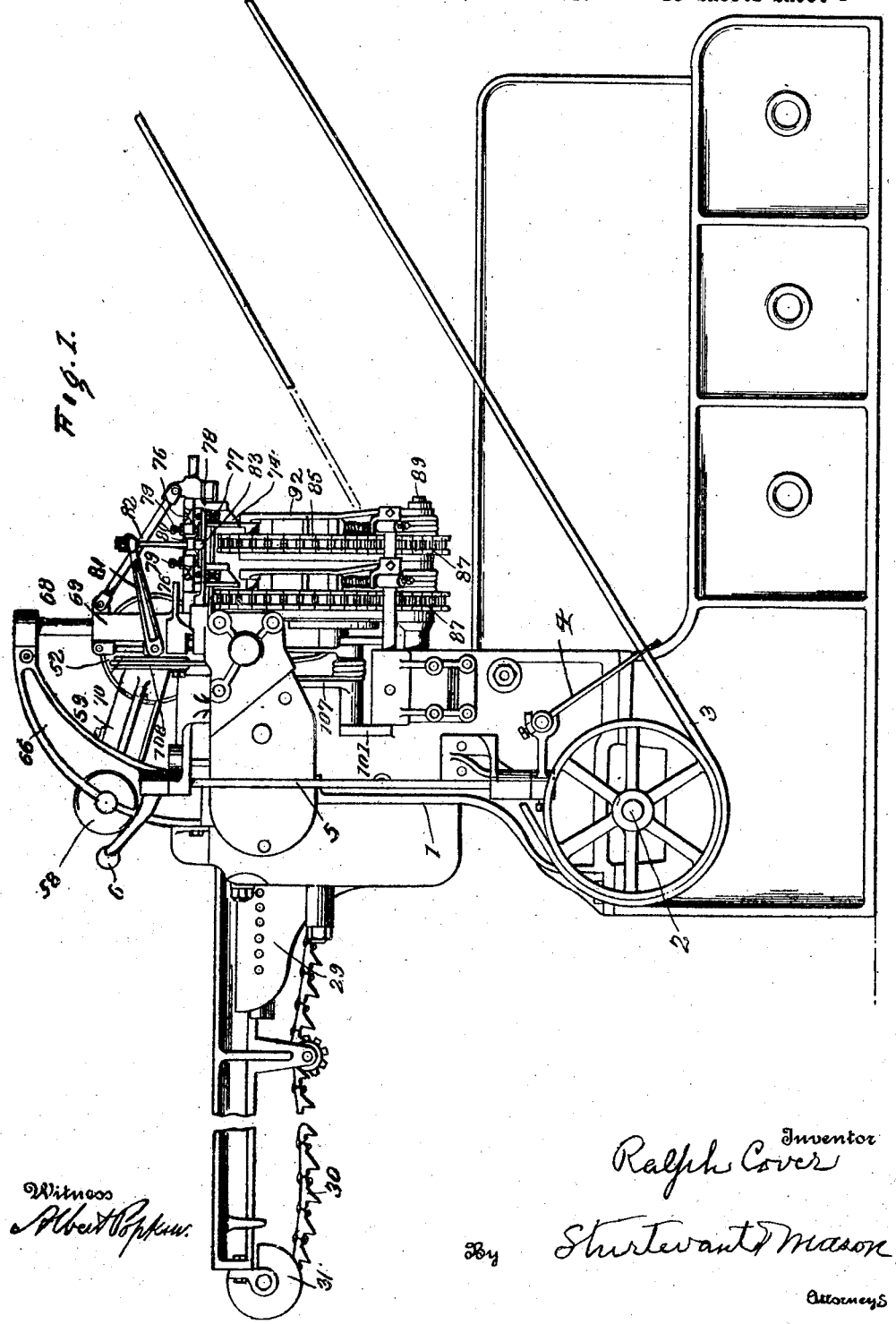
Figure 1 is a side view of a machine embodying my improvements.

The ears of corn after the butts have been severed therefrom drop into the husking machine which is shown in Figures 1 and 5 of the drawings. As herein shown, the husking machine consists of two units, each of which has a pair of husking rolls 132 and 133. Located between these husking units is a partition 134.

Mounted on the partition 134 is a distributor 135. This distributor is pivoted to the partition, as indicated at 135$^a$, and may rock on the partition from the full line position shown in Figure 5 to the dotted line position shown therein. When in the full line position shown in this figure, the upper end of the distributor extends to the left of the center of the machine so that an ear as it is dropped by the feed chains after they have been debutted, will strike the distributor and rock the same to the dotted line position and drop onto the right hand husking unit. This sets the distributor so that the next ear will be thrown onto the left hand husking unit and so on, equally distributing the ears, first on one husking unit and then on the other. By this arrangement of a single debutting unit and a plurality of husking units, I am able to greatly increase the capacity of the machine as it is well known that the husking of the ear is a slower process than the debutting of the same. Furthermore, by the utilizing of two husking units a longer period of time is given for the husking operation without unduly extending the length of the husking rolls.

The husking rolls are operated by bevel gears 136 which mesh with bevel gears 137 on the main shaft 2. (See Figure 4 of the drawings.) The stalk or butt cut from the ear drops into a chute 137' and is carried by this chute into a suitable receptacle.

From the above, it will be apparent that I have provided a debutting machine which is capable of operating upon ears of corn varying greatly in shape and diameter and at the same time bring about an efficient positioning of the ear so that the butt will be severed from the ear substantially at the grain shoulder in every instance, thus efficiently releasing the husks and without wasting any of the grain. It will also be noted that the machine is positive in operation and at the same time simple in construction. It will be further noted that the parts of the debutting machine are driven through a yielding clutch which prevents any possible bending or breaking of the parts through the locking of the parts of the machine.

It will be obvious that the details of construction may be greatly varied and that the arrangement of the parts may be also varied without departing from the spirit of the invention as set forth in the appended claims.

Having thus described my invention, what I claim as new and desire to secure by Letters Patent, is:

1. A corn debutting machine including cutting means, alining means for positioning the ear for debutting, a vertically movable cross head, devices controlled by the ear for raising the cross head, and devices controlled by the cross head for varying the capacity of the alining means to correspond to the size of the ear being debutted.

2. A corn debutting machine including cutting means, alining means operating upon the grain shoulder of the ear for positioning the ear for debutting, means for moving the ear endwise for causing the grain shoulder to approach the alining means from the body of the ear, a vertically movable cross head, devices controlled by the ear for raising the cross head, and devices controlled by the cross head for varying the capacity of the alining means to correspond to the size of the ear being debutted.

3. A corn debutting machine including in combination cutting means, spaced alining devices engaging the ear at the butt thereof for positioning the same relative to the cutting means, a vertically movable cross head, devices controlled by the ear for raising the cross head, and devices controlled by the cross head for varying the space between the alining devices to correspond to the size of the ear being debutted.

4. A corn debutting machine including in combination cutting means, spaced rotating alining devices, means for causing the butt of the ear to engage said alining devices, a vertically movable cross head, presser means engaging the ear and connected to the cross head for raising the same, and means controlled by the vertical movement of the cross head for varying the space between the alining devices to correspond to the size of the ear being debutted.

5. A corn debutting machine including in combination cutting means, spaced rotating alining devices, means for causing the butt of the ear to engage the alining devices, a vertically movable cross head, a presser wheel, a pivoted frame supporting the presser wheel, means for connecting the frame to the cross head, whereby the up and down movements of the wheel will raise and lower the cross head, devices controlled by the cross head for varying the space between the alining devices to correspond to the size of the ear being debutted.

6. A corn debutting machine including in combination cutting means, spaced rotating alining devices, means for causing the butt of the ear to engage the alining devices, a vertically movable cross head, a presser wheel, a pivoted frame supporting the presser wheel, means for connecting the frame to the cross head, whereby the up and down movements of the wheel will raise and lower the cross head, rollers carried by the cross head, cam levers cooperating respectively with the rollers, arms connected respectively to the alining devices for moving the same toward and from each other, means controlled by the levers for moving the arms away from each other, and springs for moving the arms toward each other.

7. A corn debutting machine including in combination cutting means, spaced rotatable alining devices, means for causing the butt of the ear to engage the alining devices, a vertically movable cross head, a presser wheel, a pivoted frame supporting the presser wheel, means for connecting the frame to the cross head, whereby the up and down movements of the wheel will raise and lower the cross head, rollers carried by the cross head, levers having cam slots formed therein cooperating respectively with the rollers, whereby the levers are positively moved back and forth, arms connected respectively to the alining devices, springs engaging the arms for normally moving the alining devices toward each other, and a stop carried by the levers engaging respectively the arms for positively moving the same away from each other.

8. A corn debutting machine including in combination cutting means, spaced rotating alining devices for engaging the ear at the butt for positioning the same relative to the cutting devices, a vertically movable cross head, means controlled by the ears for raising the cross head, rollers carried by the cross head, cam levers cooperating respectively with the rollers, arms connected to the respective alining devices, springs connected to the arms for moving the arms toward each other, and means carried by the levers for engaging the arms for moving the same away from each other.

9. A corn debutting machine including in combination cutting means, alining means, feeding in rolls for feeding the ears to the alining means, said feeding in rolls being inclined to each other so as to form a feeding in trough for the ears, and means for positively rotating said feeding in rolls.

10. A corn debutting machine including in combination cutting means, alining means, feeding in rolls for feeding the ears to the alining means, said feeding in rolls being inclined to each other so as to form a feeding in trough for the ears, means for positively rotating said feeding in rolls, and means for supporting the rolls whereby they may yield downwardly and away from each other to permit the projecting stalks or stems to pass the same.

11. A corn debutting machine including in combination cutting means, alining means, a feed chain for feeding the ears to the machine, feeding in rolls between the feed chains and the alining means, said feeding in rolls being inclined to each other and of uniform diameter throughout, and means for rotating said rolls.

12. A corn debutting machine including in combination cutting means, alining means, a feed chain for feeding the ears to the machine, feeding in rolls between the feed chains and the alining means, said feeding in rolls being inclined to each other and of uniform diameter throughout, means for rotating said rolls, and means for yieldingly supporting the rolls whereby they may yield downwardly and away from each other to permit the projecting stalks or stems of the ears to pass the same.

13. A corn debutting machine including in combination cutting means, alining means, a feed chain for feeding the ears to the machine, a plurality of pairs of feeding in rolls for receiving the ears from the chain and delivering the same to the alining devices, said feeding in rolls being of uniform diameter and inclined to each other so as to form a guiding trough, and means for positively rotating the rolls.

14. A corn debutting machine including in combination cutting means, alining means, a feed chain for feeding the ears to the machine, a plurality of pairs of feeding in rolls for receiving the ears from the chain and delivering the same to the alining devices, said feeding in rolls being of uniform diameter and inclined to each other so as to form a guiding trough, means for positively rotating the rolls, and means for yieldingly mounting the rolls whereby they may be moved downwardly and away from each other to permit the projecting stalks or stems of the ears to pass the same.

15. A corn debutting machine including cutting means, alining means, feeding in rolls for feeding the ears to the alining means, said rolls being arranged in pairs and inclined to each other so as to form a guiding trough, a shaft at each side of the alining devices, means for supporting the rolls at each side of the machine on the respective shafts, so that they may swing downwardly and away from each other about the shafts as an axis, cooperating gears carried by the shafts and the respective rolls, a housing for the gears associated with each roll, an arm projecting from the housing, a spring connected to the arm of each housing, said springs being positioned so as to move the inner ends of the rolls upwardly and toward each other, and stops to limit the upward movements of the rolls.

16. A debutting machine including in combination spaced alining devices for engaging the grain shoulder of the ear for positioning the same relative to the cutting means, a vertically movable cross head, a presser plate connected to and moved therewith, a presser wheel, a pivoted frame supporting the wheel, and means for connecting the same to the cross head, said wheel and presser plate being disposed so as to engage the upper face of the ear as it passes over the alining devices.

17. A debutting machine including cutting means, spaced alining devices, a vertically movable cross head, a presser wheel engaging the upper face of the ear, said presser wheel including spaced disks, a presser plate carried by the cross head and having an upturned receiving end extending into the space between the disks in the presser wheel, means for supporting the wheel whereby it may move vertically, and means whereby the vertical movements of the wheel are imparted to the cross head.

18. A debutting machine including cutting means, spaced alining devices, a vertically movable cross head, a presser wheel engaging the upper face of the ear, said presser wheel including spaced disks, a presser plate carried by the cross head and having an upturned receiving end extending into the space between the disks in the presser wheel, means for supporting the wheel whereby it may move vertically, means whereby the vertical movements of the wheel are imparted to the cross head, and means for positively rotating said presser wheel.

19. A corn debutting machine including cutting means, spaced alining devices, a vertically movable cross head, a presser plate carried by the cross head, a presser wheel, a pivoted frame on which said presser wheel is mounted, means for positively rotating said presser wheel, means for connecting the frame to the cross head, whereby the up and down movements of the frame are imparted to the cross head, said presser wheel having spaced disks and said presser plate having its receiving end upturned and extending into the space between said disks.

20. A corn debutting machine including cutting means, spaced alining devices, a presser plate, cooperating retarding plates over which the ear passes, said retarding plates and presser plate being disposed so as to engage the ear at three spaced points in the circumference for centering and controlling the ear.

21. A corn debutting machine including cutting means, spaced alining devices, a presser plate engaging the upper face of the ear, cooperating retarding plates for engaging the ear at spaced points at the underside thereof, and devices controlled by the ear for shifting the retarding plates to correspond with the size of the ear.

22. A corn debutting machine including cutting means, spaced alining devices, a presser plate for engaging the upper face of the ear, a plurality of pairs of cooperating retarding plates for engaging the ear at spaced points at the underside thereof, means for supporting said retarding plates whereby they may yield independently, said retarding plates being inclined in the path of travel of the ear as it passes between the retarding plates and the presser plates.

23. A corn debutting machine including cutting means, spaced alining devices, a vertically movable cross head, means controlled by the ear for raising the cross head, a presser plate mounted on the cross head, cooperating retarding plates for engaging the underface of the ear at spaced points, means for pivotally supporting said retarding plates on the cross head, whereby said plates move bodily up and down on the cross head, and means controlled by the ear for swinging the retarding plates about their pivotal supports so as to vary the distance between the retarding plates and the presser plates corresponding to the size of the ear passing underneath the cross head.

24. A corn debutting machine including cutting means, alining means, and devices cooperating with the alining means including spaced pairs of retarding plates.

25. A corn debutting machine including cutting means, alining means, and devices cooperating with the alining means including spaced pairs of retarding plates, pairs of feed chains for engaging the alined ear and presenting the same to the cutting devices, one pair of said feed chains being between the first pair of retarding plates and the alining means, the other pair of feed chains being between the pairs of retarding plates.

26. A corn debutting machine including cutting means, alining means, and devices cooperating with the alining means including spaced pairs of retarding plates, pairs of feed chains for engaging the alined ear and presenting the same to the cutting devices, one pair of said feed chains being between the first pair of retarding plates and the alining means, the other pair of feed chains being between the pairs of retarding plates, and means for mounting the feed chains whereby each chain may yield independently of the others.

27. A corn debutting machine including cutting means, alining means, a vertically movable cross head controlled by the ear, a plurality of pairs of retarding plates carried by the cross head and movable bodily up and down therewith, a presser plate carried by the cross head and cooperating with the retarding plates, and means controlled by the up and down movements of the cross head for moving the members in each pair of retarding plates toward and from each other to correspond to the size of the ear passing underneath the cross head.

28. A corn debutting machine including cutting means, alining means, and devices for feeding the ear from alined position to the cutting means, said devices including a plurality of pairs of feed chains, and means for supporting said feed chains, whereby each may yield independently of the others.

29. A corn debutting machine including cutting means, alining means, and devices for feeding the ear from the alining means to the cutting means, said devices including a plurality of pairs of feed chains, a spring moving each feed chain toward the center of the machine, and stops for determining the inner position of the feed chains.

30. In apparatus of the character described, the combination with butt-severing means, of mechanism for advancing an ear of corn into operative relation thereto, said mechanism including a pair of horizontally alined coned rolls rotatably mounted with their smaller ends adjacent, said rolls being capable of relative axial movement, a roll arranged above said coned rolls and rotatable on an axis parallel with theirs, all the said rolls cooperating to engage the periphery of an ear of corn passing lengthwise therebetween, such upper rolls being so mounted as to be free to move up and down while resting on such ear to allow for variations in ear diameter, a shiftable lever for moving each coned roll axially, a cam device for operating said lever, a carriage arranged to be moved vertically in synchronism with the up and down movement of said upper roll, and means on said carriage for actuating said cam device.

31. In apparatus of the character described, the combination, with butt-severing means, of means for properly positioning relatively thereto an ear of corn to be de-butted, said means comprising cooperating driven ear-engaging rolls adapted and arranged to advance an ear of corn lengthwise one of said rolls being so mounted as to be movable transversely of its axis in response to variations in ear diameter, and means movable with such movable roll to receive an ear delivered by said cooperating rolls.

32. In apparatus of the character described, the combination with butt-removing means, of means arranged to advance an ear of corn lengthwise, a device arranged to receive an ear so advanced, said device being arranged to frictionally engage and laterally confine the ear, and means for effecting relative movement between the received ear and said butt-removing means to remove the butt.

33. In apparatus of the character described, the combination, with butt-severing means, of means for properly positioning relatively thereto an ear of corn to be debutted, said means comprising cooperating driven ear-engaging rolls adapted and arranged to advance an ear of corn lengthwise, one of said rolls being so mounted as to be movable transversely of its axis in response to variations in ear diameter, means movable with such movable roll to receive an ear delivered by said cooperating rolls, said means comprising a guide member disposed in substantially fixed relation to said movable roll, and spring pressed members adapted to cooperate with said guide member in yieldingly holding an ear of corn.

34. In apparatus of the character described, the combination, with butt-serving means, of means for properly positioning relatively thereto an ear of corn to be debutted, said means comprising cooperating driven ear-engaging rolls adapted and arranged to advance and ear of corn lengthwise, one of said rolls being so mounted as to be movable transversely of its axis in response to variations in ear diameter, means movable with such movable roll to receive an ear delivered by said cooperating rolls, said means comprising a guide member disposed in substantially fixed relation to said movable roll, spring pressed members adapted to cooperate with said guide member in yieldingly holding an ear of corn, and means operable to alter the position of said spring pressed members relative to said guide member when the receiving means moves.

35. In apparatus of the character described, in combination, a plurality of rolls having their rotation axes in substantially the same plane, said rolls being arranged to laterally engage and confine an ear of corn fed lengthwise therebetween and transversely of said plane, one of said rolls being yieldingly mounted to accommodate varying ear diameters, a carriage, means supported by said carriage in proper position to receive an ear discharged from said rolls, and means connecting said carriage with such yielding roll in such manner that yielding movement of said roll occasions corresponding movement of said carriage while maintaining them in proper relative position.

36. In apparatus of the character described, in combination, a plurality of rolls having their rotation axes in substantially the same plane, said rolls being arranged to laterally engage and confine an ear of corn fed length-wise therebetween and transversely of said plane, one of said rolls being yieldingly mounted to accommodate varying ear diameters, a carriage, adjustable ear-receiving means suported by said carriage, and means operable by movement of such yielding roll to effect proper corresponding movement of said carriage and also to adjust said ear-receiving means.

37. In apparatus of the character described, in combination, a plurality of rolls having their rotation axes in substantially the same plane, said rolls being arranged to laterally engage and confine an ear of corn fed lengthwise therebetween and transversely of said plane, one of said rolls being arranged to ride on the upper side of such ear and being pivotally mounted to permit movement vertically, a vertically reciprocable carriage means connecting such pivotally mounted roll with said carriage whereby movements of said roll impart substantially coextensive vertical movements to said carriage, ear-receiving means, including adjustable holding members, supported by said carriage, and means connected to said pivotally mounted roll and arranged to act on said adjustable holding members when said roll rises.

38. In apparatus of the character described, in combination, a plurality of rolls having their rotation axes in substantially the same plane, said rolls being arranged to laterally engage and confine an ear of corn fed lengthwise therebetween and transversely of said plane, one of said rolls being yieldingly mounted to accommodate varying ear diameters, and ear-receiving means to which an ear of corn is discharged from said rolls, said ear-receiving means being connected to such yielding roll for movement in synchronism and proper alinement therewith.

39. In apparatus of the character described, feeding mechanism for advancing an ear of corn lengthwise, comprising a plurality of cooperating adjacent pairs of feed rolls, each pair comprising oppositely disposed rolls each of which is supported at one end and extends obliquely toward the other, the assembled pairs forming a generally trough-shaped feeding train, and means for driving said rolls.

40. In apparatus of the character described, feeding mechanism for advancing an ear of corn lengthwise, comprising two parallel drive shafts, a plurality of feed rolls secured at one end thereto but free to rock thereon, said rolls being oppositely disposed in cooperating parallel adjacent pairs, gear means, whereby each roll is driven from its corresponding shaft, and resilient means normally maintaining the free ends of the rolls on the two shafts in operative proximity to each other to support an ear of corn between them.

41. In apparatus of the character described, the combination, with butt-severing means, of a conveyor device for bringing ears of corn into engagement with said means, said conveyor device comprising a plurality of cooperating parallel pairs of rocker members, each pivotally supported near one end, each pair comprising two oppositely disposed individually rockable rocker members, suitable sprockets and a conveyor chain carried by each said rocker member, and means for yieldably holding the rocker members of each pair with their free ends operatively adjacent to receive an ear of corn.

42. In apparatus of the character described, the combination, with butt-severing means, of a conveyor device for bringing ears of corn into engagement with said means, said conveyor device comprising a plurality of cooperating parallel pairs of rocker members, each pivotally supported near one end, and independently movable about its pivot, each pair comprising two oppositely disposed individually rockable rocker members, suitable sprockets and a conveyor chain carried by each said rocker member, and means for yieldably holding the rocker members of each pair with their free ends operatively adjacent to receive an ear of corn.

43. In apparatus of the character described, the combination, with a suitable machine frame and rotary debutting knife mechanism mounted thereon, of a pair of rocker members supported to rock in a plane parallel to the cutting plane of said knife mechanism and adjacent to said mechanism, stop means limiting such rocking movement, suitable sprockets and a conveyor chain carried by each rocker member, adjustable means for properly positioning said rocker members, said adjustable means comprising a part secured to said machine frame and removable to permit said rocker members to rock far enough apart to give access to said knife mechanism, without disturbing adjustment of said stop means.

44. In apparatus of the character described, the combination with butt-removing means, of means arranged to advance an ear of corn lengthwise, receiving means arranged to receive an ear of corn so advanced and to exert lateral pressure thereon, and means for effecting relative movement between the received ear and said butt-removing means to remove the butt.

45. In apparatus of the character described, the combination, with butt-severing means, of means for properly positioning relatively thereto an ear of corn to be debutted, said means comprising cooperating driven ear-engaging rolls adapted and arranged to advance an ear of corn lengthwise, movably mounted members cooperating to engage laterally and to support an ear of corn delivered thereto by said rolls, and resilient means arranged to move said members against such ear.

46. In apparatus of the character described, feeding mechanism for advancing an ear of corn lengthwise, comprising two parallel drive shafts, a plurality of feed rolls secured at one end thereto but free to rock thereon, said rolls being oppositely disposed in cooperating parallel adjacent pairs, gear means whereby each roll is driven from its corresponding shaft, and resilient means normally maintaining the free ends of the rolls on the two shafts in operative proximity to each other to support an ear of corn between them.

47. In apparatus of the character described, the combination, with a pair of horizontal coaxial spaced alinement rolls, of a concave fluted roll arranged above and cooperating with said alinement rolls to engage an ear of corn passing lengthwise therebetween, a horizontal axle upon which the upper roll is revolubly mounted, a supporting member adjacent one end of which said axle is carried and which is mounted to swing about a horizontal axis at some distance to the rear of said rolls, a pair of fixed vertical guides spaced apart in front of said axle and closely adjacent thereto, a carriage having tubular portions embracing said guides for vertical sliding movement thereon, links each pivoted at one end on said axle and at the other end on one of said tubular portions at a point substantially directly above said axle, a downwardly concave guide plate horizontally mounted on said carriage at a level somewhat higher than the upper peripheries of said alinement rolls and extending forward from a point adjacent said rolls, said plate having a narrow portion extending rearwardly and lying within the concave periphery of said lifting roll between it and said alinement rolls, two pairs of depending wings pivoted to said carriage adjacent to but on opposite sides of said guide plate, the wings on each side being spaced apart, springs tending to swing the opposed wings inward toward each other and up towards said guide plate, an abutment lug on each wing, stop means adapted to engage the wing lugs when the carriage is in its lowermost position and thereby to limit the inward swing of the wings, wing spreaders each pivoted adjacent a pair of said wing lugs and operable to engage the same to spread the wings, and arms fixed to the opposite ends of the lifting roll axle and extending forward therefrom, and connected to said wing spreaders to actuate the same when the carriage rises.

48. In apparatus of the character described, the combination with a pair of horizontal coaxial spaced alinement rolls, of a third roll arranged above and cooperating with said alinement rolls to engage an ear of corn passing lengthwise therebetween, supporting means swingable about a horizontal axis and supporting said third roll for up and down movement in an arc, fixed vertical guide means, a carriage vertically movable thereon, connecting means whereby up and down movements of said roll effect vertical movements of said carriage, adjustable-capacity ear-receiving means supported by said carriage in operative relation to said alinement rolls, a device connected to said swingable supporting means and having a part swinging in an arc of greater radius than said third roll, and means connected to said part and operable thereby to adjust the capacity of said ear-receiving means.

49. In apparatus of the character described, the combination with butt-severing means, of a pair of horizontally alined-frusto-conical fluted alinement rolls revolubly mounted with their smaller ends adjacent, said rolls being movable axially to vary the distance between said ends, a pivotally mounted shifting lever for each roll, a cam lever pivoted adjacent each shifting lever, each said cam lever having a cam slot and being provided with a projection arranged to engage the shifting lever upon outward movement of said cam lever, spring means tending to move each shifting lever inward when its cooperating cam lever moves inward, a supporting member pivoted on a fixed horizontal axis parallel to that of said alinement rolls and up to the rear or feeding-in side thereof, a concave fluted lifting roll revoluble upon a horizontal axle carried by said supporting member, said axle being parallel with the axis of said alinement rolls and substantially vertically above the same, said concave roll being arranged to rest upon an ear passing over said alinement rolls on its way to said butt-severing means, a pair of spaced vertical guides arranged closely adjacent said axle, a carriage having tubular portions embracing said guides for vertical sliding movement thereon, links each pivoted at one end on said axle and at the other on one of said tubular portions at a point overhanging said axle, a downwardly concave guide plate horizontally mounted on said carriage at a level somewhat higher than the upper peripheries of said alinement rolls and extending forward from a point adjacent said rolls, said plate having a narrow portion extending rearwardly and lying within the concave periphery of said lifting roll between it and said alinement rolls, two pairs of depending wings pivoted to said carriage adjacent to but on opposite sides of said guide plate, the wings on each side being spaced apart, springs tending to swing the opposed wings inward toward each other and up toward said guide plate, an abutment lug on each wing, stop means adapted to engage the wing lugs when the carriage is in its lowermost position and thereby to limit the inward swing of the wings, wing spreaders each pivoted adjacent a pair of said wing lugs and operable to engage the same to spread the wings, arms fixed to the opposite ends of the lifting roll axle and extending forward therefrom, and connected to said wing spreaders to actuate the same when the carriage rises, cam rollers mounted on said carriage and respectively cooperating with the cam slots in said cam levers to move the same outward when the carriage rises and thereby to move said alinement rolls farther apart, means for feeding ears of corn endwise and point first to said alinement rolls, chain conveyor means arranged to transfer an alined ear of corn sidewise from said wings into engagement with said butt-severing means, and means for driving the ear-feeding means, said rolls, and said conveyor means.

In testimony whereof, I affix my signature.

RALPH COVER.